US006958365B2

(12) United States Patent
Dontula et al.

(10) Patent No.: US 6,958,365 B2
(45) Date of Patent: Oct. 25, 2005

(54) MANUFACTURING PROCESS FOR OPEN CELLED MICROCELLULAR FOAM

(75) Inventors: Narasimharao Dontula, Rochester, NY (US); Jehuda Greener, Rochester, NY (US); Cathy A. Fleischer, Rochester, NY (US); Chul B. Park, Etobicoke (CA); Patrick C. Lee, Toronto (CA); Jin Wang, Scarborough (CA); Hani E. Naguib, Ottawa (CA)

(73) Assignee: Eastman Kodak Company, Rochester, NY (US)

( * ) Notice: Subject to any disclaimer, the term of this patent is extended or adjusted under 35 U.S.C. 154(b) by 105 days.

(21) Appl. No.: 10/436,740

(22) Filed: May 13, 2003

(65) Prior Publication Data

US 2004/0229968 A1 Nov. 18, 2004

(51) Int. Cl.⁷ .................................................. C08J 9/12
(52) U.S. Cl. ............................. 521/81; 262/51; 262/53; 262/54; 521/79
(58) Field of Search ........................ 521/79, 81; 264/51, 264/53, 54

(56) References Cited

U.S. PATENT DOCUMENTS

| 3,573,152 | A | | 3/1971 | Wiley et al. |
| 3,745,202 | A | | 7/1973 | Riggleman et al. |
| 4,183,984 | A | | 1/1980 | Browers et al. |
| 4,323,528 | A | | 4/1982 | Collins |
| 4,473,665 | A | | 9/1984 | Martini-Vvedensky et al. |
| 4,824,720 | A | | 4/1989 | Malone |
| 4,877,679 | A | | 10/1989 | Leatherman et al. |
| 4,902,456 | A | | 2/1990 | Yen et al. |
| 4,906,377 | A | | 3/1990 | Yen et al. |
| 5,158,986 | A | | 10/1992 | Cha et al. |
| 5,160,674 | A | | 11/1992 | Colton et al. |
| 5,238,623 | A | | 8/1993 | Mrozinski |
| 5,273,697 | A | | 12/1993 | Raad et al. |
| 5,334,356 | A | | 8/1994 | Baldwin et al. |
| 5,674,916 | A | | 10/1997 | Shmidt et al. |
| 5,677,355 | A | | 10/1997 | Shalaby et al. |
| 5,679,718 | A | | 10/1997 | Suh et al. |
| 5,759,639 | A | | 6/1998 | Kloos |
| 5,780,521 | A | | 7/1998 | Shmidt et al. |
| 5,847,012 | A | | 12/1998 | Shalaby et al. |
| 5,854,295 | A | | 12/1998 | Suh et al. |
| 5,859,076 | A | | 1/1999 | Kozma et al. |
| 5,863,960 | A | | 1/1999 | Shmidt et al. |
| 5,866,053 | A | | 2/1999 | Park et al. |
| 5,869,544 | A | | 2/1999 | Shmidt et al. |
| 5,910,358 | A | * | 6/1999 | Thoen et al. ............. 428/316.6 |
| 5,962,545 | A | | 10/1999 | Chaudhary et al. |
| 6,051,174 | A | | 4/2000 | Park et al. |
| 6,132,858 | A | | 10/2000 | Kloos |
| 6,169,122 | B1 | | 1/2001 | Blizard et al. |
| 6,235,380 | B1 | | 5/2001 | Tupil et al. |
| 6,251,319 | B1 | | 6/2001 | Tusim et al. |
| 6,284,810 | B1 | | 9/2001 | Burnham et al. |
| 6,294,115 | B1 | | 9/2001 | Blizard et al. |
| 6,322,347 | B1 | | 11/2001 | Xu |
| 6,376,059 | B1 | | 4/2002 | Anderson et al. |
| 6,414,047 | B1 | | 7/2002 | Abe |
| 6,558,607 | B1 | * | 5/2003 | Winter et al. ............... 264/425 |
| 2002/0082311 | A1 | | 6/2002 | Dietzen et al. |
| 2002/0107315 | A1 | * | 8/2002 | Chaudhary et al. ......... 524/371 |

FOREIGN PATENT DOCUMENTS

| EP | 0262249 | 4/1988 |
| WO | 96/34038 | 10/1996 |

OTHER PUBLICATIONS

V. Padareva, C. B. Park, P. C. Lee and H. E. Naguib, *Extruded Filamentary Open–Celled LDPE/PS Foams Using Non–Homogeneous Melt Structure* (Abstract only) submitted not published Oct. 16, 2002.

V. Padareva, C. B. Park, P. C. Lee and H. E. Naguib, *Extruded Open–Celled LDPE–Based Foams Using Non–Homogeneous Melt Structure* (Abstract only) submitted not published Jan. 24, 2003.

V. Padareva, C. B. Park, P. C. Lee and H. E. Naguib, *Extruded Open–Celled LDPE–Based Foams Using Non––Homogeneous Melt Structure,* submitted not published Jan. 9, 2003.

V. Padareva, C. B. Park, P. C. Lee and H. E. Naguib, *Extruded Open–Celled LDPE–Based Foams Using Non–Homogeneous Melt Structure,* submitted not published Feb. 7, 2003.

Co–pending U.S. Appl. No. 10/436,654, Dontula et al., *A Manufacturing Process And Use For Open Celled Microcellular Foam*(D–86345).

D. Klempner and K.C. Frisch, *Handbook of Polymeric Foams and Foam Technology,* N.Y. (1991), pp. 47–72.

W. R. Hale, K. K. Dohrer, M. R. Tant, and I. D. Sand, Colloids and Surfaces A, 187, 483, (2001).

B. I. Chaudhary and R. P. Barry, Foams 99, 19–33 (1999).

K. Kaji, M. Hatada, I. Yoshizawa, and C. Kohara, J. Appl. Polym. Sci., 37, 2153–2164 (1989).

(Continued)

Primary Examiner—Morton Foelak
Assistant Examiner—Irina S. Zemel
(74) Attorney, Agent, or Firm—Lynne M. Blank

(57) ABSTRACT

The present invention relates to a method for making an open celled microcellular foam comprising providing at least one foamable polymer and a crosslinking agent in an extruder, injecting at least one blowing agent into said at least one foamable polymer and said crosslinking agent in said extruder, blending said blowing agent injected into said at least one foamable polymer and said crosslinking agent in said extruder, feeding said blended blowing agent, at least one foamable polymer and said crosslinking agent in said extruder to a die, and depressurizing said blended blowing agent, said at least one foamable polymer and said crosslinking agent.

19 Claims, 10 Drawing Sheets

OTHER PUBLICATIONS

Q. Huang, B. Seibig, and D. Paul, J. Membrane Sci., 161, 287–291 (1999).

Q. Huang, B. Seibig, and D. Paul, J. Cellular Plast., 36, 112–125 (2000).

SPI Plastics Engineering Handbook of the Society of the Plastics Industry, Inc., 5th Ed. (1991), pp. 552–576.

A. H. Behravesh, C. B. Park, and R. D. Venter, Cellular Polymers, 17, 309–326, (1998).

C. B. Park, A. H. Behravesh, and R.D. Venter, Polym. Eng. Sci., 38, 1812–1823, (1998).

C.R. Thomas, The formation of Cellular Plastics, pp. 552–558, British Plastics Sep. 1965.

* cited by examiner

MANUFACTURING PROCESS FOR OPEN CELLED MICROCELLULAR FOAM

CROSS-REFERENCE TO RELATED APPLICATIONS

Reference is made to commonly assigned, co-pending U.S. patent application Ser. No. 10/436,654 by Dontula et al. filed of even date herewith entitled "A Manufacturing Process And Use For Open Celled Microcellular Foam", the disclosure of which is incorporated herein.

FIELD OF THE INVENTION

The present invention relates to the preparation of open celled microcellular foams.

BACKGROUND OF THE INVENTION

Until recently, open celled foam structures have been manufactured almost exclusively from polyurethane thermosetting materials. D. Klempner and K. C. Frisch, Handbook of Polymeric Foams and Foam Technology, N.Y. (1991). Open celled thermoplastic foam structures have been produced by foaming as well as several other methods, such as voiding, leaching/extraction, thermally induced phase separation (TIPS) and phase inversion processes.

One way of making open celled foam structures without foaming is to prepare the specimen by uniformly blending a polymer resin and sized salt particles, and then leaching the soluble filler from the polymer matrix to create pores of different sizes, depending on the size of the salt particles. See C. R Thomas, Brit. Plast. 38, 552 (1965). Another leaching/extraction processes has also been disclosed in U.S. Pat. No. 3,745,202. U.S. Pat. No. 3,745,202 describes the use of extrusion of mixture of polymers and plasticizers to form a hollow fiber which is then stretched, and cured in air, in a water bath or in an aqueous solution of a plasticizer. This causes formation of porous hollow fiber. This is then subsequently treated with various solutions for treatment of the polymer and extraction of additives. This process is cumbersome, expensive and uses chemical solvents.

The thermally induced phase separation (TIPS) method involves forming a polymer solution with a leachable low molecular weight organic compound, followed by phase separation caused by rapid cooling and removal of the organic solvent by leaching. TIPS may be classified as liquid-liquid phase separation, liquid-solid phase separation and solid-liquid phase separation, where the first adjective describes the state of the polymer and the second adjective describes the low molecular weight organic compound. Shalaby et al., in U.S. Pat. Nos. 5,677,355 and 5,847,012 have modified the TIPS method to manufacture open cell foams. The method described by Shalaby involves co-melting a solid, crystalline fugitive organic compound like salicylic acid, naphthalene with an organic polymer to form an isotropic solution. This solution is then rapidly quenched using cryogenic techniques or water/air as a convection medium to form a foam precursor. This precursor which contains the dispersed fugitive compound was then treated by several techniques like leaching by solvent or sublimation through heating under vacuum. The resultant structure was determined to be a continuous open cell structure. This technique of manufacturing is cumbersome, involves a sequence of batch processes and does not yield a high cell density. Furthermore, it is not a continuous process and extraction of organic compounds needs to be done with care to prevent collapse. The TIPS process has also been described in U.S. Pat. Nos. 4,902,456 and 4,906,377 for manufacture of fluorocarbon porous films. Mrozinski in U.S. Pat. No. 5,238,623 describes use of TIPS along with an extraction process to achieve microporous polyolefin shaped article.

Kloos in U.S. Pat. Nos. 5,759,639 and 6,132,858 has described the manufacture of porous films using the phase inversion technique. Kloos describes the use of a polymer dope solution, which is coated on a substrate and then quenched in a nonsolvent, to produce a microporous structure. This technique is not attractive since it typically deals with organic solvents.

A voiding process to manufacture open cell structures has been disclosed in U.S. Pat. No. 4,877,679. Voiding, caused by the stretching of mineral filled polymers, has also been used to create an interconnected microporous structure by debonding at the mineral/polymer interface. See W. R. Hale, K. K. Dohrer, M. R. Tant, and I. D. Sand, Colloids and Surfaces A, 187, 483, (2001). Voiding can also be accomplished by stretching of immiscible polymers. U.S. Pat. No. 4,877,679 describes a unique process that combines voiding and extraction of plasticizer using a solvent to manufacture a microporous polyolefinic article. Requirements of this process are use of linear ultra high molecular weight polyethylene/polypropylene with dispersed insoluble filler and large amounts of plasticizer that is extracted during the manufacturing process. The stretching of mineral filled polymers has also been used to create an interconnected microporous structure by debonding at the mineral/polymer interface. See W. R. Hale, K. K. Dohrer, M. R. Tant, and I. D. Sand, Colloids and Surfaces A, 187, 483, (2001).

Another method of producing a foam structure is to use an interpolymer. Dow Chemical Co. developed Ethylene-Styrene Interpolymers (ESI) by copolymerization of ethylene and styrene monomers, and the open cell morphology of ESI can be easily controlled. See B. I. Chaudhary and R. P. Barry, Foams 99, 19–33 (1999).

Grafting is another common method to achieve an open celled foam structure. See K. Kaji, M. Hatada, I. Yoshizawa, and C. Kohara, J. Appl. Polym. Sci., 37, 2153–2164 (1989). Recently, Kozma et al. introduced the silane grafting method (see M. L. Kozma, J. D. Bambara, R. F. Hurley, U.S. Pat. No. 5,859,076 (1999)). This technology is widely used in the foaming field. The blends of polyethylene and soft ethylene vinyl acetate (B. I. Chaudhary and B. A. Malone, U.S. Pat. No. 5,962,545 (1999)) or linear low density polyethylene (S. Abe, U.S. Pat. No. 6,414,047 B1 (2002)) were used to produce an open celled structure.

An open celled foam can also be created by opening up closed cells using a sharp needle. See S. D. Browers and D. E. Wiegand, U.S. Pat. No. 4,183,984 (1980).

These previous methods deal with foam structures having relatively large cell size. It has only been observed recently that microcellular open celled polycarbonate hollow fibers could be produced by adjusting the amount of injected $CO_2$ and by changing the temperatures of the extruding head and nozzle. See Q. Huang, B. Seibig, and D. Paul, J. Membrane Sci., 161, 287–291 (1999); see also Q. Huang, B. Seibig, and D. Paul, J. Cellular Plast., 36, 112–125 (2000).

Polyurethane foams are typically produced by combining and reacting two hydroxyl-terminated compounds of polyol and polyisocyanate. See SPI Plastics Engineering Handbook of the Society of the Plastics Industry, Inc., 5th Ed. (1991). In general, high molecular weight, low functionality polyols produce a low amount of crosslinking, which leads to a flexible foam and vise versa. Therefore, by manipulating the formulation of two ingredients of polyurethane, any degree of flexibility can be achieved, and thereby, cell wall rupturing can be controlled.

Few thermoplastic foams with a very high open cell content are available because the manufacturing technologies for open celled thermoplastic foams have not been developed extensively. In the past, most thermoplastic foams have been produced in closed cells to preserve mechanical properties significantly while saving the material cost. However, such foams with isolated cells are not fit for applications requiring high permeability of gas or vapor, selective osmosis, and absorption and dampening of sound.

U.S. Pat. Nos. 6,051,174 and 5,866,053 disclose an extrusion system for providing a foamed material in which a material is supplied to an extruder for movement through a rotating screw member. The material is placed in a molten state and a foaming agent, such as a supercritical fluid, is introduced into the extruder at a selected pressure so that a two-phase mixture of the molten material and the foaming agent is formed. The foaming agent is then diffused into and dissolved in the molten material to form a single-phase solution which is forwarded from a solution formation to a nucleation device. A thermodynamic instability is induced through a rapid pressure drop, e.g., higher than 0.9 GPa/s in the nucleation device to nucleate microcells in the solution. A further shaping device, e.g., a die, can be used to produce a foamed material of a desired shape.

U.S. Pat. No. 5,334,356 discloses a supermicrocellular foamed material and a method for producing such material. The material to be foamed is a polymerplastic material, having a supercritical fluid, such as carbon dioxide in its supercritical state, introduced into the material to form a foamed fluid/material system having a plurality of cells distributed substantially throughout the material. Cell densities lying in a range from about $10^9$ to about $10^{15}$ per cubic centimeter of the material can be achieved with the average cell sizes being at least less than 2.0 microns and preferably in a range from about 0.1 micron to about 1.0 micron.

If highly open celled foams with interconnections among adjacent cells can be produced in a cost effective manner, they will be used in numerous industrial applications such as, for example, filters, separation membranes, and diapers. In particular, fine celled or microcellular open celled foams will exhibit better properties for the applications requiring high permeability of gas or vapor, selective osmosis, and absorption and dampening of sound.

PROBLEM TO BE SOLVED

There remains a need for a cost effective, continuous and an easily tailorable method for producing thermoplastic foams comprising small cells of less than 50 microns with a very high open cell content.

SUMMARY OF THE INVENTION

The present invention relates to a method for making an open celled microcellular foam comprising providing at least one foamable polymer and a crosslinking agent in an extruder, injecting at least one blowing agent into said at least one foamable polymer and said crosslinking agent in said extruder, blending said blowing agent injected into said at least one foamable polymer and said crosslinking agent in said extruder, feeding said blended blowing agent, at least one foamable polymer and said crosslinking agent in said extruder to a die, and depressurizing said blended blowing agent, said at least one foamable polymer and said crosslinking agent. The present invention also relates to an imaging element comprising at least one image receiving layer and a support, wherein said image receiving layer comprises an open celled microcellular foam. The present invention also relates to an imaging element comprising at least one image receiving layer, an absorbing layer and a support, wherein the absorbing layer comprises an open celled microcellular foam.

ADVANTAGEOUS EFFECT OF THE INVENTION

The present invention includes several advantages, not all of which are incorporated in a single embodiment. The advantages may include a high open cell content or a high open cell content with very small cell size. The method may advantageously provide a large process window with respect to temperature and pressure. The method may be applicable to multiple resins. The open celled foams may have selective osmosis transportation, high permeability to gas and vapor, and be better ability to absorb and dampen sound.

DETAILED DESCRIPTION OF THE INVENTION

The present invention relates to an open celled foaming extrusion process for thermoplastic foamable polymers utilizing a blowing agent and a crosslinker. In one preferred embodiment, the method for making an open celled microcellular foam comprises providing at least one foamable polymer and a crosslinking agent in an extruder, injecting at least one blowing agent into the foamable polymer in the extruder, blending the blowing agent into the foamable polymer and crosslinking agent, feeding the foamable polymer, crosslinking agent and blowing agent to a die, and depressurizing the blended foamable polymer, crosslinking agent and blowing agent. The present invention also relates to an imaging element comprising at least one image receiving layer, absorbing layer and a support, wherein said absorbing layer comprises an open celled microcellular foam. In another preferred embodiment, the absorbing layer is located between the support and the imaging layer. In another embodiment, the imaging element comprises at least one image receiving layer and a support, wherein the image receiving layer comprises an open celled microcellular foam.

The terms as used herein, "top", "upper", and "face" mean the side or toward the side of the element receiving an image. The terms "bottom", "lower side", and "back" mean the side opposite that which receives an image. For the purposes of the present invention, microcellular foams are foams having cell sizes less than 50 microns and cell densities greater than or equal to $10^6$ cells/$cm^3$. In a most preferred embodiment of the present invention, the open celled microcellular foams comprise foams having open cells sizes from 10 to 50 microns in average diameter.

Figure 3:
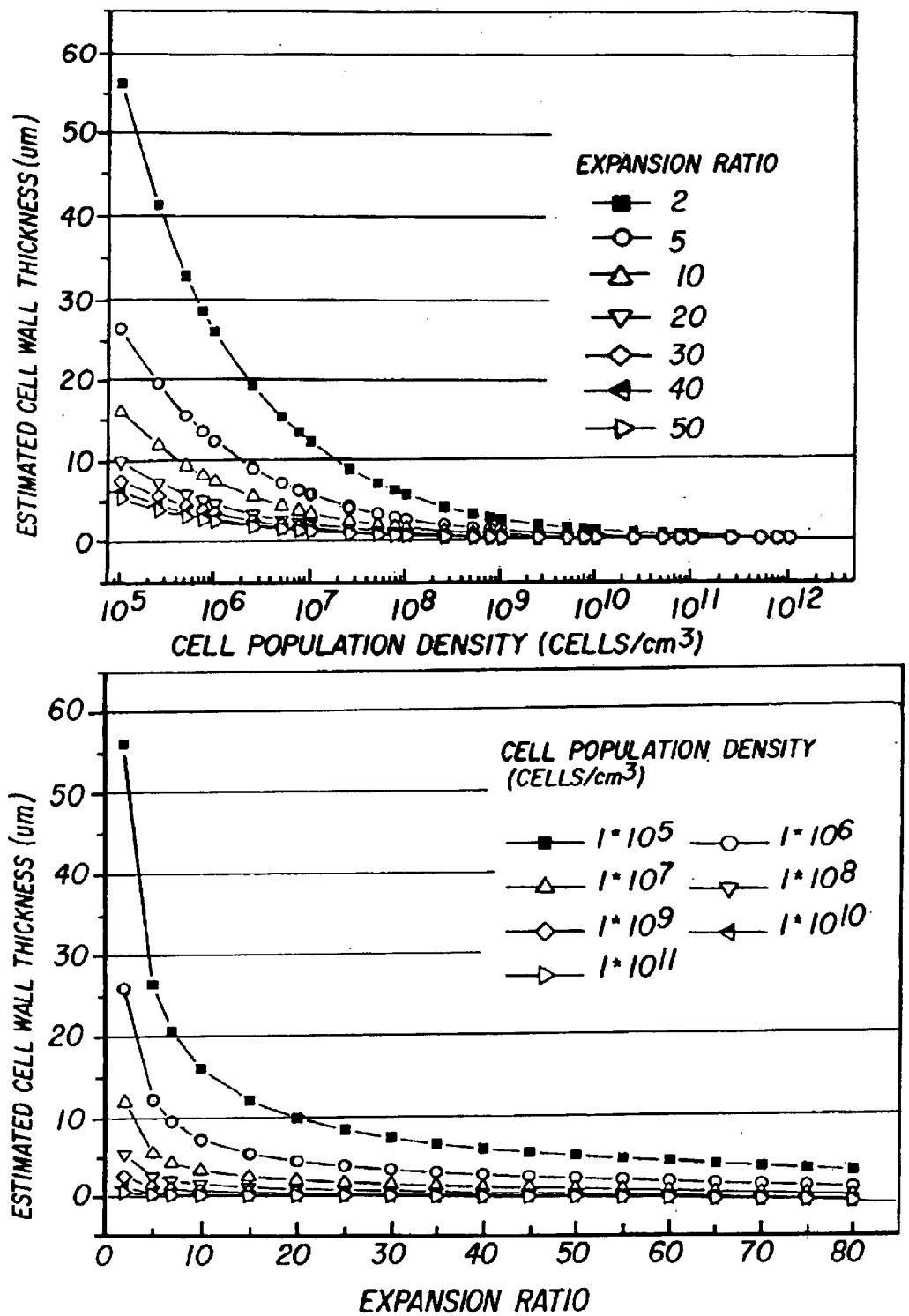
FIG. 3 illustrates an average cell wall thickness versus a cell population density.

The present invention relates to an open celled microcellular foam comprising at least one foamable polymer, a crosslinking agent and at least one blowing agent. Cell opening to produce an open celled foam may depend on cell wall thickness, which may be related to material characteristics, such as foamable polymer and blowing agent selection or crosslinking, and processing conditions, such as temperature and pressure. These factors in turn may affect the cell population density and volume expansion. FIG. 3 shows an average cell wall thickness as a function of the cell density and the expansion ratio.

The thermoplastic foamable polymer of the invention may be any natural or synthetic foamable polymer. The thermoplastic foamable polymer may also be any water soluble or insoluble foamable polymer. The water soluble foamable polymers preferred include gelatin, poly(vinyl alcohol), poly(ethylene oxide), polyvinylpyrolidinone, poly(acrylic acid), poly(styrene sulfonic acid), polyacrylamide, and quaternized polymers. The thermoplastic foamable polymers useful in the practice of the invention may also be extrudable and moldable. Preferred thermoplastic foamable polymers are polyolefins, polyesters, polystyrenes, acrylics, poly(vinyl alcohol) or polyamides.

The thermoplastic foamable polymer may be a thermoplastic resin. Illustrative of useful thermoplastic resins are polylactones such as poly(pivalolactone), poly(caprolactone), polyurethanes derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'diphenyl-methane diisocyanate, 3,3-'dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, tolidine diisocyanate, hexamethylene diisocyanate, 4,4'-diisocyanatodiphenylmethane, and linear long chain diols such as poly(tetramethylene adipate), poly(ethylene adipate), poly(1,4-butylene adipate), poly(ethylene succinate), poly(2,3-butylenesuccinate), polyether diols, polycarbonates such as poly(methane bis(4-phenyl) carbonate), poly(1,1 -ether bis(4-phenyl) carbonate), poly(diphenylmethane bis(4-phenyl)carbonate), poly(1,1-cyclohexane bis(4-phenyl)carbonate), poly(2,2-bis-(4-hydroxyphenyl) propane) carbonate, polysulfones, polyether ether ketones, polyamides such as poly (4-amino butyric acid), poly(hexamethylene adipamide), poly(6-aminohexanoic acid), poly(m-xylylene adipamide), poly(p-xylyene sebacamide), poly(2,2,2-trimethyl hexamethylene terephthalamide), poly(metaphenylene isophthalamide) (Nomex®), poly(p-phenylene terephthalamide)(Kevlar®), polyesters such as poly(ethylene azelate), poly(ethylene-1, 5-naphthalate), poly(ethylene-2,6-naphthalate), poly(1,4-cyclohexane dimethylene terephthalate), poly(ethylene oxybenzoate) (A-Tell®), poly(para-hydroxy benzoate) (Ekonol®), poly(1,4-cyclohexylidene dimethylene terephthalate) (Kodel®) (cis), poly(1,4-cyclohexylidene dimethylene terephthalate) (Kode®l) (trans), polyethylene terephthlate, polybutylene terephthalate, poly(arylene oxides) such as poly(2,6-dimethyl-1,4-phenylene oxide), poly(2,6-diphenyl-1,4-phenylene oxide), poly(arylene sulfides) such as poly(phenylene sulfide), polyetherimides, vinyl polymers and their copolymers such as poly(vinyl acetate), poly(vinyl alcohol), poly(vinyl chloride), poly(vinyl butyral), poly(vinylidene chloride), ethylene-vinyl acetate copolymers, polyacrylics, polyacrylate and their copolymers such as poly(ethyl acrylate), poly(n-butyl acrylate), poly(methylmethacrylate), poly(ethyl methacrylate), poly(n-butyl methacrylate), poly(n-propyl methacrylate), poly(acrylamide), polyacrylonitrile, poly(acrylic acid), ethylene-acrylic acid copolymers, ethylene-vinyl alcohol copolymers, acrylonitrile copolymers, methyl methacrylate-styrene copolymers, ethylene-ethyl acrylate copolymers, methacrylated butadiene-styrene copolymers, polyolefins such as (linear) low and high density poly(ethylene), poly(propylene), chlorinated low density poly(ethylene), poly(4-methyl-1-pentene), poly(ethylene), poly(styrene), ionomers, poly(epichlorohydrins), poly(urethane) such as the polymerization product of diols such as glycerin, trimethylol-propane, 1,2,6-hexanetriol, sorbitol, pentaerythritol, polyether polyols, polyester polyols with a polyisocyanate such as 2,4-toluene diisocyanate, 2,6-toluene diisocyante, 4,4'-diphenylmethane diisocyanate, 1,6-hexamethylene diisocyanate, 4,4'-dicycohexylmethane diisocyanate, and polysulfones such as the reaction product of the sodium salt of 2,2-bis(4-hydroxyphenyl) propane and 4,4'-dichlorodiphenyl sulfone, furan resins such as poly(furan), cellulose ester plastics such as cellulose acetate, cellulose acetate butyrate, cellulose propionate, silicones such as poly(dimethyl siloxane), poly(dimethyl siloxane), poly(dimethyl siloxane co-phenylmethyl siloxane), protein plastics, polyethers, polyimides, polyvinylidene halides, polycarbonates, polyphenylenesulfides, polytetrafluoroethylene, polyacetals, polysulfonates, polyester ionomers, polyolefin ionomers. Copolymers and/or mixtures of these aforementioned polymers may also be used.

Vulcanizable and thermoplastic rubbers useful in the practice of this invention may also vary widely. Illustrative of such rubbers are brominated butyl rubber, chlorinated butyl rubber, polyurethane elastomers, fluoroelastomers, polyester elastomers, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyester and the elastomeric blocks such as poly(butadiene), poly(isoprene), ethylene-propylene copolymers, ethylene-butylene copolymers, polyether ester as for example the copolymers in poly(styrene)-poly(butadiene)-poly(styrene) block copolymer manufactured by Shell Chemical Company under the trade name of Kraton®. Copolymers and/or mixtures of these aforementioned polymers may also be used. Preferred thermoplastic foamable polymers for the present invention are polymers such as polyolefins, polystyrenes, polyamides, polyesters, poly(vinyl alcohol), thermoplastic urethanes, and polymers of alpha-beta unsaturated monomers and copolymers, and blends thereof.

Polyamides, which may be used in the present invention, are synthetic linear polycarbonamides characterized by the presence of recurring carbonamide groups as an integral part of the polymer chain, which are separated from one another by at least two carbon atoms. Polyamides of this type include polymers, generally known in the art as nylons, obtained from diamines and dibasic acids having the recurring unit represented by the general formula:

—NHCOR$^1$COHNR$^2$— in which R$^1$ may be an alkylene group of at least 2 carbon atoms, preferably from 2 to 11 or arylene having at least 6 carbon atoms, preferably 6 to 17 carbon atoms, and R$^2$ may be selected from R$^1$ and aryl groups. Also included are copolyamides and terpolyamides obtained by known methods, for example, by condensation of hexamethylene diamine and a mixture of dibasic acids consisting of terephthalic acid and adipic acid. Polyamides of the above description are well known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6, 10), poly(hexamethylene isophthalamide), poly(hexamethylene terephthalamide), poly(heptamethylene pimelamide) (nylon 7,7), poly(octamethylene suberamide) (nylon 8,8), poly(nonamethylene azelamide) (nylon 9,9), poly(decamethylene azelamide) (nylon 10,9), poly(decamethylene sebacamide) (nylon 10,10), poly(bis(4-amino cyclohexyl)methane-1,10-decane-carboxamide)), poly(m-xylylene adipamide), poly(p-xylene sebacamide), poly(2,2,2-trimethyl hexamethylene terephthalamide), poly(piperazine sebacamide), and poly(p-phenylene terephthalamide), poly(metaphenylene isophthalamide).

Other useful polyamides may be those formed by the polymerization of amino acids and derivatives thereof as, for example, lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-amino-decanoic acid) (nylon 10), poly(11-aminoundecanoic acid) (nylon 11), and poly(12-aminododecanoic acid) (nylon 12).

Preferred polyamides for use in the practice of this invention include poly(caprolactam), poly(12-aminododecanoic acid), poly(hexamethylene adipamide), poly(m-xylylene adipamide), and poly(6-aminohexanoic acid) and copolymers and/or mixtures thereof, for their widespread application and effectiveness in the present invention.

Other foamable polymers, which may be employed in the practice of this invention, are linear polyesters. The type of polyester is not critical and the particular polyesters chosen for use in any particular situation will depend essentially on the physical properties and features, i.e., tensile strength, modulus, desired in the final form. Thus, a multiplicity of linear thermoplastic polyesters having wide variations in physical properties may be suitable for use in this invention.

The particular polyester chosen for use may be a homopolyester or a co-polyester, or mixtures thereof, as desired. Polyesters may be normally prepared by the condensation of an organic dicarboxylic acid and organic diols. Illustrative examples of useful polyesters will be described herein below in terms of these diol and dicarboxylic acid precursors.

Polyesters which may be suitable for use in this invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters. Exemplary of useful cycloaliphatic, aliphatic and aromatic polyesters which may be utilized in the practice of this invention are poly(ethylene terephthalate), poly(cyclohexlenedimethylene) terephthalate, poly(ethylene dodecate), poly(butylene terephthalate), poly(ethylene naphthalate), poly(ethylene(2,7-naphthalate)), poly(methaphenylene isophthalate), poly(glycolic acid), poly(ethylene succinate), poly(ethylene adipate), poly(ethylene sebacate), poly(decamethylene azelate), poly(ethylene sebacate), poly(decamethylene adipate), poly(decamethylene sebacate), poly(dimethylpropiolactone), poly(para-hydroxybenzoate) (Ekonol®), poly(ethylene oxybenzoate) (A-tell®), poly(ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylene dimethylene terephthalate), (Kodel®) (cis), and poly(1,4-cyclohexylene dimethylene terephthalate (Kodel®) (trans).

Polyester compounds prepared from the condensation of a diol and an aromatic dicarboxylic acid are preferred for use in this invention. Illustrative of such useful aromatic carboxylic acids are terephthalic acid, isophthalic acid, o-phthalic acid, 1,3-napthalenedicarboxylic acid, 1,4 napthalenedicarboxylic acid, 2,6-napthalenedicarboxylic acid, 2,7-napthalenedicarboxylic acid, 4,4'-diphenyldicarboxylic acid, 4,4'-diphenysulfphonedicarboxylic acid, 1,1,3-trimethyl-5-carboxy-3-(p-carboxyphenyl)-idane, diphenyl ether 4,4'-dicarboxylic acid, and bis-p(carboxy-phenyl) methane. Of the aforementioned aromatic dicarboxylic acids, those based on a benzene ring (such as terephthalic acid, isophthalic acid, orthophthalic acid) are preferred for use in the practice of this invention.

Of these preferred acid precursors, terephthalic acid is a particularly preferred acid precursor because it leads to polyesters that are less prone to degradation during melt processing and more dimensionally stable.

Preferred polyesters for use in the practice of this invention include poly(ethylene terephthalate), poly(butylene terephthalate), poly(1,4-cyclohexylene dimethylene terephthalate) and poly(ethylene naphthalate) and cofoamable polymers and/or mixtures thereof. Among these polyesters of choice, poly(ethylene terephthalate) is most preferred, because of its excellent mechanical strength, manufacturability, and effectiveness in the present invention.

Another set of useful thermoplastic foamable polymers may be formed by polymerization of alpha-beta unsaturated monomers of the formula:

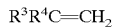

wherein: $R^3$ and $R^4$ may be the same or different and may be cyano, phenyl, carboxy, alkylester, halo, alkyl, alkyl substituted with one or more chloro or fluoro, or hydrogen. Illustrative of such preferred foamable polymers are polymers of ethylene, propylene, hexene, butene, octene, vinylalcohol, acrylonitrile, vinylidene halide, salts of acrylic acid, salts of methacrylic acid, tetrafluoroethylene, chlorotrifluoroethylene, vinyl chloride, and styrene. Copolymers and/or mixtures of these aforementioned polymers may also be used in the present invention.

Preferred thermoplastic foamable polymers formed by polymerization of alpha-beta unsaturated monomers for use in the practice of this invention are polypropylene, polyethylene, polystyrene and copolymers and/or mixtures thereof, with polypropylene polymers and copolymers being most preferred for their low cost and good mechanical and surface properties.

Figure 11:
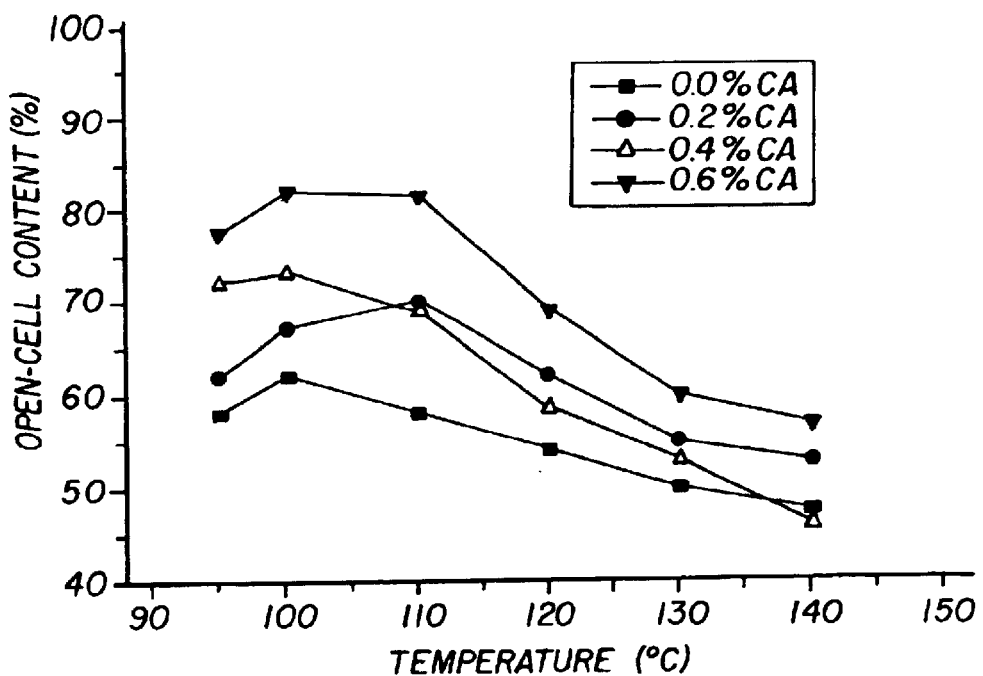
FIG. 11 illustrates the open cell contents versus die temperatures of low density polyethylene (LDPE) with crosslinking agent content varying from 0 to 0.6 wt. %, 8 wt. % $CO_2$, 0% PS.
Figure 12:
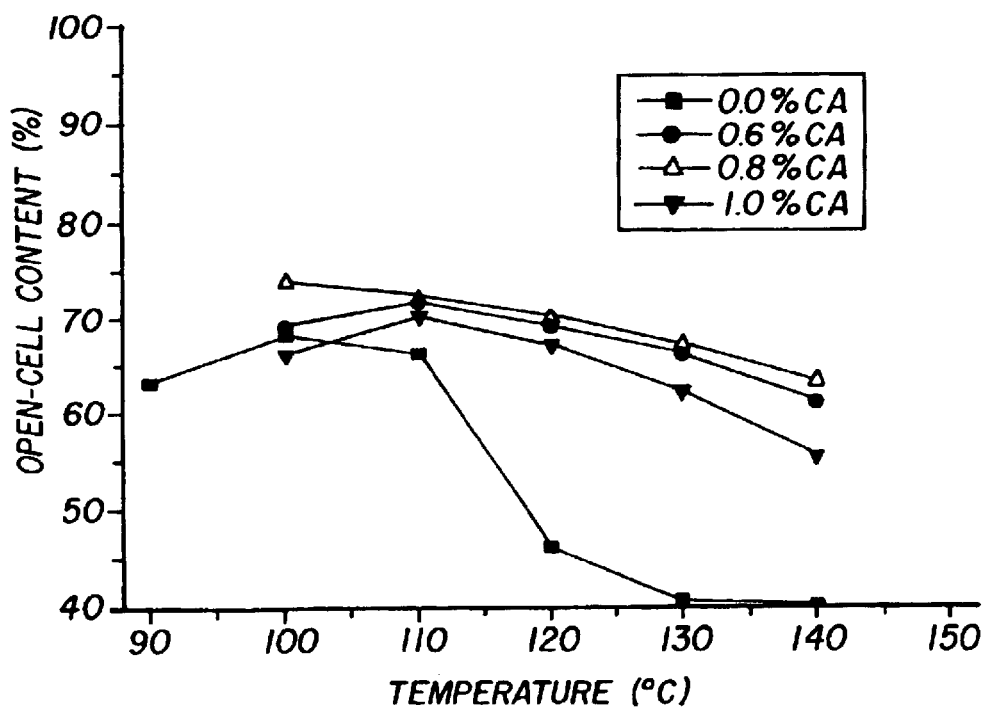
FIG. 12 illustrates the open cell content versus die temperatures of low density polyethylene (LDPE) B with crosslinking agent content varying from 0 to 1.0 wt. %, 8 wt. % $CO_2$, 0% PS.

The preferred thermoplastic foamable polymers suitable for the invention are those polymeric compounds having good thermal stability, low melt flow rate, or a low melt index, preferably, from 0.3 to 75, more preferably from 0.3 to 25, and most preferably from 0.3 to 10. Furthermore, these polymers should have a suitable melt strength appropriate for foaming at the desired processing temperatures. Exemplars include, but are not limited to, polyolefins such as polyethylene, polypropylene, polystyrene, ABS resins, polyamide, polyester, polycarbonate resins, polyvinylpyrolidinone, and polyethylene oxide, poly(vinyl alcohol), thermoplastic urethanes, as well as their interpolymers and blends. As illustrated by FIGS. 11 and 12, the polymeric material chosen may affect open cell content.

The foaming of these polymers may be carried out through several mechanical, chemical, or physical means. Mechanical methods include whipping a gas into a foamable polymer melt, solution, or suspension, which then hardens either by catalytic action or heat or both, thus entrapping the gas bubbles in the matrix. Chemical methods include such techniques as the thermal decomposition of chemical blowing agents generating gases such as nitrogen or carbon dioxide by the application of heat or through exothermic heat of reaction during polymerization. Physical methods include such techniques as the expansion of a gas dissolved in a foamable polymer mass upon reduction of system pressure, the incorporation of hollow microspheres in a polymer matrix, or the volatilization of low boiling liquids such as fluorocarbons or methylene chloride. The choice of foaming technique is dictated by desired foam density reduction, desired properties, and manufacturing process.

In a preferred embodiment of this invention polyolefins such as polyethylene and polypropylene, poly(vinyl alcohol), thermoplastic urethanes, their blends and their copolymers are used as the polymer in the foam along with a chemical blowing agent such as sodium bicarbonate and its mixture with citric acid, organic acid salts, azodicarbonamide, azobisformamide, azobisisobutyrolnitrile, diazoaminobenzene, 4,4'-oxybis(benzene sulfonyl hydrazide) (OBSH), N,N'-dinitrosopentamethyltetramine (DNPA), sodium borohydride, and other blowing agent agents well known in the art. The preferred chemical blowing agents would be sodium bicarbonate/citric acid mixtures, azodicarbonamide; though others may also be used. If necessary, these foaming agents may be used together with an auxiliary foaming agent, or nucleating agent.

In another preferred embodiment, the foamable polymers are utilized along with a physical blowing agent, most preferably a gas. Preferred blowing agents useful in making the present foams include inorganic blowing agents, organic blowing agents and chemical blowing agents. Suitable inorganic blowing agents include nitrogen, sulfur hexafluoride (SF.sub.6), argon, water, air and helium. Organic blowing agents include carbon dioxide, aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane (normal butane), iso-butane, n-pentane, iso-pentane, neo-pentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride,), 1,1-difluoroethane (HFC-152a), fluoroethane (HFC-161), 1,1,1 -trifluoroethane (HFC-143a), 1,1,1,2-tetrafluoroethane (HFC-134a), 1,1,2,2 tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloro-ethane, 1,1-dichloro-1-fluoroethane (HCFC-141b), 1-chloro-1,1-difluoroethane(HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane(CFC-12), trichloro-trifluoroethane (CFC-113), dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitroso-terephthalanide, trihydrazino triazine and mixtures of citric acid and sodium bicarbonate, such as the various products sold under the name Hydrocerol® (Boehringer Ingelheim). All of these blowing agents may be used as single components or any mixture of combination thereof, or in mixtures with other co-blowing agents.

In a preferred embodiment, carbon dioxide is used as the blowing agent. In another preferred embodiment carbon dioxide is used with a low molecular weight aliphatic hydrocarbon. Preferred hydrocarbons may include propane, ethane, butane, pentane, and isomers and mixtures thereof.

Another preferred embodiment may comprise a combination of mechanical, chemical, or physical means. In one preferred embodiment, both a chemical and physical blowing agent may be utilized, most preferably carbon dioxide in combination with normal butane or iso-butane.

The amount of blowing agent incorporated into the polymer melt material may be from 0.5 to 6.0 gram-moles per kilogram of polymer, preferably from 0.2 to 4.0 gram-moles per kilogram of polymer, and most preferably from 0.5 to 3.0 gram-moles per kilogram of polymer. The use of a relatively small amount of blowing agent may allow formation of a foam with a high open cell content.

One possible strategy for achieving a high open cell content in the present invention may be to induce an inhomogeneous structure, through the creation of a hard/soft melt structure, via crosslinking or polymer blending and then foaming. The stiffness of the foamable polymer matrix after blending of the materials and/or the decomposing of the crosslinking agent is not uniform throughout the matrix in a nonhomogenous structure. This creates an irregular dispersion with hard and soft regions in the structure. In order to produce an open celled structure, while maintaining an overall cellular structure, some portions of the foamable polymer matrix must act as a skeleton or a hard frame of cells, while others must be soft enough to be ruptured. Hard regions will behave as hard cell struts, which maintain the overall cell shapes, while the soft regions will eventually be ruptured and create interconnection among adjacent cells.

Various crosslinking agents and technologies are described in the art. Crosslinking may be induced by addition of a crosslinking agent. Induction of crosslinking and exposure to an elevated temperature to effect foaming or expansion may occur simultaneously or sequentially. If a chemical crosslinking agent is used, it may be incorporated into the foamable polymer material in the same manner as a chemical blowing agent, for example, by being fed into the extruder. Further, if a chemical crosslinking agent is used, the foamable melt polymer material may be heated or exposed to a temperature of preferably less than 150° C. to prevent decomposition of the crosslinking agent or the blowing agent and to prevent premature crosslinking. If radiation crosslinking is used, the foamable melt polymer material may be heated or exposed to a temperature of preferably less than 160° C. to prevent decomposition of the blowing agent. The foamable melt polymer material may be extruded or conveyed through a die of desired shape to form a foamable structure. The foamable structure may then be crosslinked and expanded at an elevated or high temperature (typically, 150° C.–250° C.), such as in an oven, to form a foam structure. If radiation crosslinking is used, the foamable structure may be irradiated to crosslink the foamable polymer material, which is then expanded at the elevated temperature.

FIGS. 11 and 12 illustrate the use of crosslinking agent to produce increased open cell content. The term "crosslinking agent" as used herein means a compound or mixture of compounds used for the purposes of substantially crosslinking a foamable polymer or foamable polymer blend. The preferred crosslinking agent comprises a peroxide, preferably an organic peroxide. Examples of organic peroxides may include, but are not limited to, di-tert-butyl peroxide, dicumyl peroxide, t-butylcumyl peroxide, 2,5 dimethyl 2,5-di(t-butylperoxy)hexane, 1,1-di(t-butylperoxy)-3,3,5-trimethyl cyclohexane, n-butyl-4,4-bis(tert-butylperoxy) valerate, benzoyl peroxide, lauroyl peroxide, dilauroyl peroxide, 2,5-dimethyl-2,5-di(tert-butylperoxy)hexene-3,2,5-bis(tert-butylperoxy)octane, tert-butylperoxy acetate, 2,2-bis(tert-butylperoxy)butane, tert-butylperoxy benzoate, di-tert-butyldiperoxy isophthalate, methyl ethyl ketone peroxide, diisopropylbenzene hydroperoxide, p-menthane hydroperoxide, 2,2-dimethyl-2,5-di(tert-butylperoxy) hexine-3,1,1,3,3-tetramethylbutylhydroperoxide, 2,5-dimetylhexane-2,5-dihydroperoxide, cumene hydroperoxide, and mixtures thereof. Among them, dicumyl peroxide and di-tert-butyl peroxide are preferable.

Other crosslinking agent which may be used in the present invention include, but are not limited to, epoxides, hydrosilation agents, radiation, azides, phenols, aldehyde-amine reaction products, substituted ureas, substituted guanidines, substituted xanthates, substituted dithiocarbamates, sulfur-containing compounds, thiazoles, imidazoles, sulfenamides, thiuramidisulfides, paraquinonedioxime, dibenzoparaquinonedioxime, sulfur; and combinations thereof.

Where an organic peroxide is used as the crosslinking agent, the decomposition point of the organic peroxide is preferably higher than the flowing initiating temperature of the polyolefin resin used in the present invention and the decomposition temperature of the organic peroxide is higher than 120 C, and especially higher than 150 C, if the decomposition half value period is 1 minute. Illustrative examples may include methyl ethyl ketone peroxide (182 C), t-butylperoxyisopropyl carbonate (153 C) and dicumyl peroxide (171 C).

A crosslinking promoter may also be included. Typical crosslinking promoters may comprise divinylbenzene, diallylbenzene and divinylnaphthalene. Preferable the crosslinking promoter is incorporated in an amount of 0.1 to 30% by weight, especially 0.3 to 20% by weight, based on the polyolefin resin.

The amount of crosslinking agent may also affect open cell content of the foam material. Open cell contents may be obtained while varying the crosslinking agent, preferably in the range of 0.01 to 10 wt. %, providing viscosity remains in an acceptable processing range. This may indicate that an increase of non-homogeneity in the thermoplastic resin matrix resulting from an increase in the crosslinking agent amount enhances the cell opening. With the use of crosslinking agents, there may be an optimum content of crosslinking agent for cell opening. On the other hand, the dispersion of crosslinked sections (i.e., the morphology or size of the gels) may have affected the open cell content significantly in addition to the degree of crosslinking (i.e., the gel content). In the case of an organic peroxide as crosslinking agent, the organic peroxide is preferably used in an amount of 0.01 to 10% by weight, more preferably 0.05 to 5% by weight, and most preferably from 0.01 to 1.0% by weight.

Figure 4:
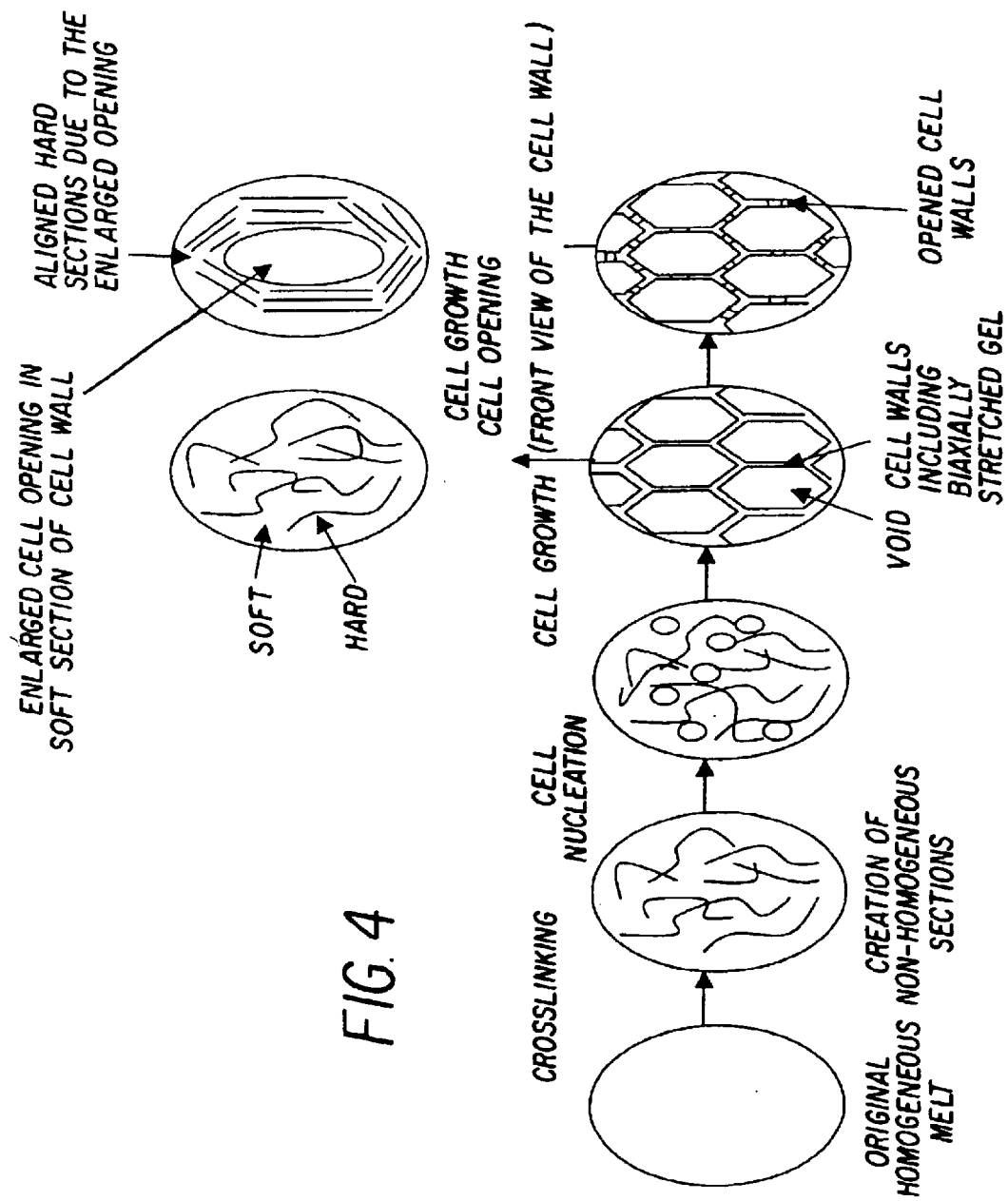
FIG. 4 illustrates an ideal cell morphology changes for open celled foaming of low density polyethylene (LDPE).

The dispersion of the crosslinking agent additives may affect the degree of cell opening using a crosslinking agent. In order to disperse these particles through the foamable polymer matrix, the processing temperature of the system should be maintained below the decomposition temperature of the crosslinking agent. Good mixing should be maintained, as partial crosslinking may occur as a result of unavoidable processing conditions, including localized hot spots in the extruder. The crosslinking agent particles may be dispersed on the same order as the target cell size to avoid the melt, consisting of hard/soft regions, behaving like a homogeneous continuum. If the interparticle distance is significantly smaller than the cell size, active coalescence may occur during cell opening. For example, FIG. 4 shows preferred changes of the morphologies that may occur for cell opening in low density polyethylene (LDPE) foams. To effectively open the uncrosslinked soft sections in the cell walls, the gel to gel distance would desirably be bigger than the cell wall thickness and smaller than the cell to cell distance.

Also useful for obtaining the desired degree of crosslinking is high energy ionizing radiation and free radical generating peroxides. Various crosslinking technologies are described in U.S. Pat. Nos. 5,869,591 and 5,977,271, the entire contents of both of which are herein incorporated by reference. Dual cure systems, which use a combination of heat, moisture cure, and radiation steps, may be effectively employed. Dual cure systems are disclosed and claimed in U.S. Pat. No. 6,124,370, incorporated herein by reference. For instance, it may be desirable to employ peroxide coupling agents in conjunction with silane coupling agents, peroxide coupling agents in conjunction with radiation, and sulfur-containing coupling agents in conjunction with silane coupling agents.

The open cell content of the foam material may also be enhanced by the use of foamable polymer blends. The use of foamable polymer blends may encourage greater volume expansion, which may result in greater open cell content. A large expansion ratio (or equivalently, a thin cell wall thickness) would be favorable to cell opening. Temperature adjustment, for example, decreasing temperature, may be one factor to control to produce thinner cell walls. However, when the temperature was too low, the stiffened melt in the cell wall suppressed cell opening as described earlier despite the thinner cell walls. According to the volume expansion ratios shown in FIG. 3, it was evident that the cell wall thickness became thinner at higher expansion ratios typically occurring at low melt temperatures, which would affect cell opening positively. However, the actual open cell content below a certain melt temperature (i.e., the optimum temperature) decreased because of the increased stiffness of the soft section in the cell walls. The expansion ratio of extruded foamable thermoplastic polymer may increase as the temperature decreased because of the entrapment of more blowing agents within the hardened skin layer, thereby facilitating cell growth [A. H. Behravesh, C. B. Park, and R. D. Venter, Cellular Polymers, 17, 309–326, (1998).]. The extrudates with more crosslinking (i.e., stiffer melt structure) showed a higher volume expansion ratio for the same reason. However, too high a melt stiffness due to excessive crosslinking worked unfavorably for achieving high volume expansion.

Since volume expansion may affect open cell content, the foamable polymeric material selected may affect open cell content. The enhancement of non-homogeneity in the thermoplastic foamable polymer melt may be further enhanced by adding an amount of incompatible polymer to the melt. The open cell content of the foam material may also be enhanced by the use of foamable polymer blends. The use of foamable polymer blends may encourage greater volume expansion which may result in greater open cell content. A large expansion ratio (or equivalently, a thin cell wall thickness) would be favorable to cell opening. According to the volume expansion ratios shown in FIG. 3, it was evident that the cell wall thickness became thinner at low melt temperatures, which would affect cell opening positively. However, the actual open cell content below a certain temperature (i.e., the optimum temperature) decreased because of the increased stiffness of the soft section in the cell walls.

The cell population density may also be a function of the inclusion of incompatible polymer into a polymer blend, for example, polystyrene added to low density polyethylene, whereas the crosslinking agent content and the temperature may not affect the cell density much. While using commercially available low pressure drop rate foam dies, with or without a low pressure-drop-rate die, the small amount of added incompatible polymer may dramatically increase the cell density by one to two orders of magnitude. In one preferred embodiment of the present invention, low density polyethylene (LDPE) melt blended with a small amount of polystyrene (PS) may be effective for further increasing the open cell content. A very high open cell content, up to 99%, may be achieved with certain foamable polymer blends. However, if the incompatible polymer phase size is too big, the incompatible polymer phase may not be included in the cell wall in the first place, which may indicate that the incompatible polymer phase may not be used in the cell opening in the cell walls during the cell wall thinning (i.e., expansion) process. Therefore, an optimum size of incompatible polymer phase may exist with respect to each cell size.

The volume expansion ratios of foamable polymer blends may also increase as the temperature decreases, because more blowing agents is entrapped within the hardened skin layer and thereby utilized in cell growth [A. H. Behravesh, C. B. Park, and R. D. Venter, Cellular Polymers, 17, 309–326, (1998).]. The foamable polymer blend extrudates with more crosslinking showed a higher volume expansion ratio for the same reason. However, too high a melt stiffness due to excessive crosslinking worked unfavorably for achieving high volume expansion in foamable polymer blends. On the other hand, unlike crosslinking agent addition, the addition of incompatible polymer phase to the foamable polymer matrix tended to decrease the volume expansion ratio, most likely because of the poor interface of incompatible polymer and foamable thermoplastic polymer.

Figure 1:
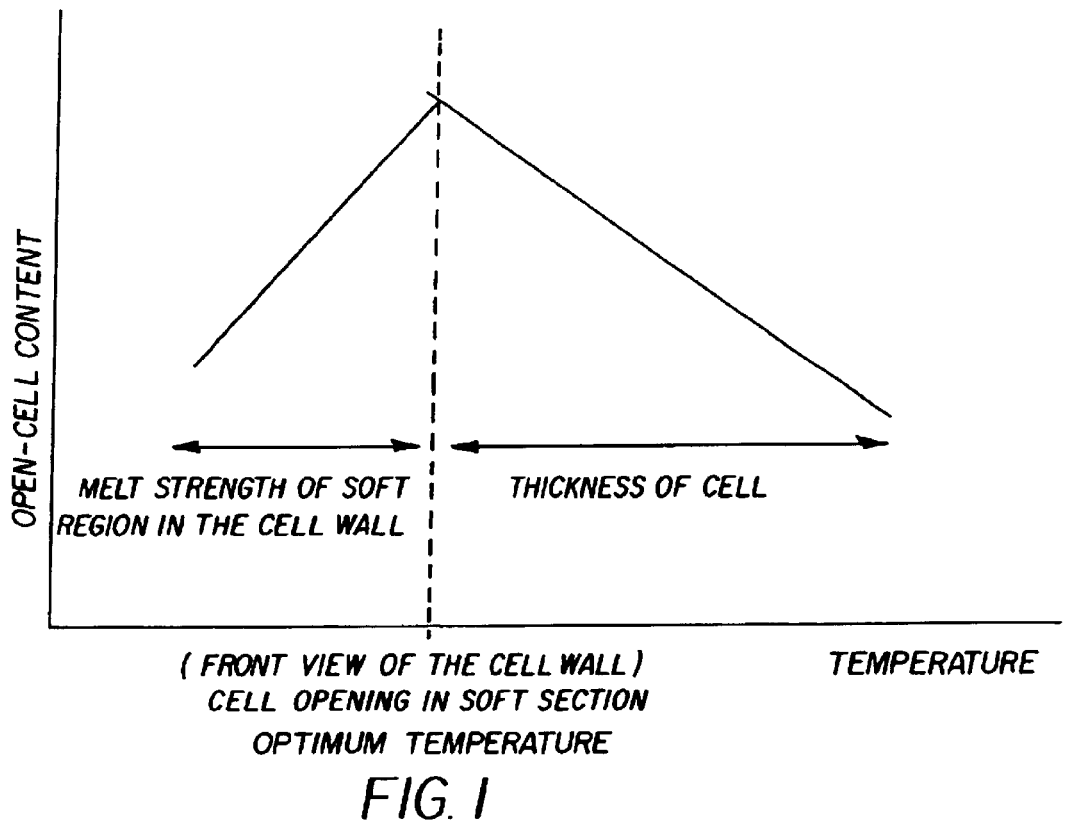
FIG. 1 illustrates two governing mechanisms for cell opening.

Another possible strategy for achieving a high open cell content may be control of the processing temperature. The processing temperature may be closely controlled to open up the weak regions. Control of the processing temperature may be particularly effective when combined with the use of a crosslinking agent or foamable polymer blend. The processing temperature, which produces the optimal open cell content, is dependent on the foamable polymer material selected for use in the foam. A large expansion ratio of foam at a low temperature may be favorable for cell opening with thin cell walls, but too low a temperature may not be desirable because of the increased melt strength. Since the soft sections may become hardened at a lower temperature, and thereby, may become difficult to be opened, a high temperature may be preferred at the time of foaming to have a greater contrast of the hard and soft sections in the foamable polymer matrix. On the other hand, a thinner cell wall thickness may be preferred to increase the degree of cell opening in the cell walls. Since the cell wall thickness decreases at a lower temperature because of a higher expansion ratio, there may be an optimum temperature to maximize the open cell content. FIG. 1 schematically illustrates a preferred temperature, indicating that at least two possible governing mechanisms exist for cell opening: the melt strength of soft sections in the cell wall and the cell wall thickness. Above the optimum temperature, the thick cell walls, caused by excessive gas loss during foaming, govern the open cell content. Below the optimum temperature, the high melt strength of the soft region in the cell walls governs the open cell content. In a preferred embodiment, there may be a large expansion ratio of foam at a high temperature so that the soft sections may be easily opened in the thin cell walls. A large expansion ratio may also be obtained with a frozen foam skin by blocking the gas escape at the skin while the melt temperature is slightly higher [C. B. Park, A. H. Behravesh, and R. D. Venter, Polym. Eng. Sci., 38, 1812–1823, (1998).]. A separate control of the foam skin temperature (i.e., the die lip temperature) may also be used to promote a high open cell content. In a preferred embodiment, the processing temperature for cell opening at various contents of a crosslinking agent desired to achieve a high open cell content up to 99% may be successfully achieved at processing temperature around 110° C. In a preferred embdoiment of the present invention, the open celled microcellular foam comprises more than 80% open cells by volume. In another preferred embodiment, the open celled microcellular foam comprises from 60% to 90% open cells by volume.

The morphologies and volume expansion ratios of open cell foams may be obtained at various processing conditions. Preferred processing conditions to obtain high open cell content would be to, choose a polymer of appropriate melt strength as the matrix resin and an appropriate crosslinker, preferably along with an dispersed phase which is an immiscible thermoplastic polymer, use blowing agent or a blowing agent mixture and foam at temperatures which are above or around the melting point (for a semi-crystalline foamable polymer) or glass transition temperature (for an amorphous foamable polymer) of matrix resin or above the glass transition temperature of matrix resin and around the melting point or glass transition temperature of dispersed resin or around or above the glass transition temperature of dispersed resin. The optimum foaming temperature range is the range where foam has high volume expansion ratios and high cell densities. In one preferred embodiment, an additional cell opening mechanism is provided when temperature is controlled in conjunction with the use of foamable polymer blends.

Various additives may be incorporated in the present foam structure such as inorganic fillers, pigments, colorants, antioxidants, acid scavengers, ultraviolet absorbers, flame retardants, processing aids, extrusion aids, permeability modifiers, antistatic agents, and thermoplastic additives. Examples of permeability modifiers include but are not limited to glycerol monoesters. These monoesters may also serve to reduce static during foam manufacture. Examples of thermoplastic additives include alkenyl aromatic homopolymers or copolymers (having molecular weight of 2,000 to 50,000) and ethylenic polymers. Optional additives which may be incorporated in the extruded foam manufacture process include nucleating agents, infrared attenuating agents, plasticizers, flame retardant chemicals, pigments, elastomers, extrusion aids, antioxidants, fillers, antistatic agents, and UV absorbers. These optional additives may be included in any amount to obtain desired characteristics of the foamable blend or resultant extruded foam products. Preferably, optional additives are added to the resin mixture but may be added in alternative ways to the extruded foam manufacture process. For example, optional additives may be incorporated before, during or after the polymerization process used to make the polymer in the resin mixture.

In addition, a nucleating agent may be added in order to control the size of foam cells. Preferred nucleating agents include inorganic substances such as calcium carbonate, talc, clay, silica, barium stearate, calcium stearate, calcium silicate, diatomaceous earth, mixtures of citric acid and sodium bicarbonate, titanium dioxide, barium sulfate, and indigo. The amount of nucleating agent employed may range from 0 to 5 parts by weight per hundred parts by weight of a polymer resin. The preferred range is from 0 to 3 parts by weight.

Plasticizers may also be added in the extruded foam manufacture process, preferably added to the foamable blend to facilitate processing of the foamable blend in an extruder. In a preferred embodiment, the plasticizer is a low molecular weight resin (molecular weight below 20,000). Examples of plasticizers include liquid paraffin or white oil, hydrogenated coconut oil, esters of C 4–C 20 monoalcohols, diols, glycerine with higher fatty acids, styrene resin, vinyl toluene resin, or alpha-methylstyrene resin. In one embodiment, from 0.1 to 20 parts of plasticizer per 100 parts of the foamable polymer is incorporated into the foamable blend. In a preferred embodiment, from 1 to 15 parts of plasticizer per 100 parts of the foamable polymer are incorporated into the foamable blend.

Flame retardant chemicals may also be added in the extruded foam manufacture process, preferably added to the foamable blend to impart flame retardant characteristics to the resulting extruded foam products. Flame retardant chemicals include brominated aliphatic compounds such as hexabromocyclododecane and pentabromocyclohexane, brominated phenyl ethers, esters of tatrabromophthalic acid, and combinations thereof. In one embodiment, from 0.1 to 5 parts of flame retardant chemicals per 100 parts of the foamable polymer is incorporated into the foamable blend. In a preferred embodiment, from 0.5 to 3 parts of flame retardant chemicals per 100 parts of the foamable polymer are incorporated into the foamable blend.

Foam structures of the present invention comprising foamable polymer, blowing agent and crosslinking agent may be made by any foaming process. The present invention particularly relates to a method for making an open celled microcellular foam comprising providing at least one foamable polymer and a crosslinking agent in an extruder, injecting at least one blowing agent into the foamable polymer and the crosslinking agent in the extruder, blending the blowing agent injected into the foamable polymer and crosslinking agent in the extruder, feeding the blend of blowing agent, foamable polymer and crosslinking agent in the extruder to a die, and depressurizing the blend of blowing agent, foamable polymer and crosslinking agent. To make a foam, the optimum temperature is at or above the glass transition temperature or melting point of the foamable blend. For the foams of the present invention the optimum foaming temperature is in a range in which the foam does not collapse. The blowing agent may be incorporated or mixed into the melt foamable polymer material by any means known in the art such as with an extruder, mixer, or blender. The blowing agent is mixed with the foamable polymer melt material at an elevated pressure sufficient to prevent substantial expansion of the foamable polymer melt material and to homogeneously disperse the blowing agent. Optionally, a nucleating agent may be blended in the foamable polymer melt or dry blended with the foamable polymer material prior to plasticizing or melting. The crosslinking agent may be dry blended with the polymer material prior to charging to the extruder, or charged to the extruder in the form of a polymer concentrate or a carrier material. The foamable blend is typically cooled to a lower temperature to optimize physical characteristics of the foam structure. Typically, cooling involves adjustment to a temperature below the melting point or glass transition temperature of the foamable polymer The blend may be cooled in the extruder or other mixing device or in separate coolers. The blend is then extruded or conveyed through a die of desired shape to a zone of reduced or lower pressure to form the foam structure. The zone of lower pressure is at a pressure lower than that in which the foamable blend is maintained prior to extrusion through the die. The lower pressure may be superatmospheric or subatmospheric (vacuum), but is preferably at an atmospheric level.

The present foam structures may be formed in a coalesced strand form by extrusion of the compositions used in the present invention through a multiorifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720.

The present foam structures may also be formed by an accumulating extrusion process as seen in U.S. Pat. No. 4,323,528. In this process, low density foam structures having large lateral crosssectional areas are prepared by: 1) forming under pressure a blend of the compositions of the present invention and a blowing agent at a temperature at which the viscosity of the blend is sufficient to retain the blowing agent when the blend is allowed to expand; 2) extruding the blend into a holding zone maintained at a temperature and pressure which does not allow the blend to foam, the holding zone having an outlet die defining an orifice opening into a zone of lower pressure at which the blend foams, and an openable gate closing the die orifice; 3) periodically opening the gate; 4) concurrently applying mechanical pressure by a movable ram on the blend to eject it from the holding zone through the die orifice into the zone of lower pressure, at a rate greater than that at which substantial foaming in the die orifice occurs and less than that at which substantial irregularities in crosssectional area or shape occurs; and 5) permitting the ejected blend to expand unrestrained in at least one dimension to produce the foam structure. The present foam structures may also be produced by microcellular foam technology processes as discussed in U.S. Pat. Nos. 6,051,174, 5,866,053, and 5,334,356.

The present foam structures may also be produced by using either a blown film or a cast film extrusion process. The films may also be made by a co-extrusion process or co-casting process to obtain foam in the core with one or two surface layers, which may or may not be comprised of the foamable polymer compositions used in the present invention.

The extruder for use in the present invention may be any extruder known for use in the prior art for extruding a foamable thermoplastic polymer. However, it is desirable for the extruder to sufficiently blend a resin and a foaming gas in order to homogenize them and thereafter to cool/adjust the temperature to a temperature suited for foaming. In one embodiment, a single screw extruder may be most generally employed. This single screw extruder is widely used because the foaming gas is not leaked from the inlet of raw materials (hopper) and the extruder is not expensive. In other embodiments, a multiple screw extruder, generally, a twin screw extruder, may also be used. Examples of the twin screw extruder include an extruder in which the screws rotate in the same direction and an extruder in which the screws rotate in different directions. Examples of the twin screw extruder further include an extruder in which the screws are parallel to each other and the screw diameters are constant and an extruder with inclined screws in which the screw diameters dwindle toward the tip. If a twin screw extruder is used in the present invention, it is preferable to provide a sealing segment because the foaming gas tends to leak from the twin screw extruder. Other extrusion configurations may also be usable, for example, a tandem extruder setup made by combining two or more of the above mentioned extruders. In one embodiment, the extruder may be under pressures greater than the solubility pressure of the blowing agent after injecting the blowing agent into the at least one foamable polymer and the crosslinking agent. In another preferred embodiment, the temperature in the extruder is greater than the melting point or glass transition temperature of the foamable polymer.

Examples of the die for use in the present invention include an annular die, flat die and a circular die. The lip gap at the tip of the die may be set in accordance with the desired thickness of the product and may take into account the downstream conditions such as, for example, takeaway speed and external cooling of foam extrudate. In one preferred embodiment, both the extruder and the die are under pressures greater than the solubility pressure of the blowing agent after injecting the blowing agent into the foamable polymer and crosslinking agent and downstream process equipment.

A gear pump for use in the present invention may be interposed between the extruder and the die, which may be linked by means of adapters. The gear pump to be used in the present invention may be a pump designed to deliver a constant amount of molten resin by means of teeth or gears which rotate in an intermeshing relationship. The gear pump may be selected from known gear pumps according to the capacity to meet the target production amount. Since a high speed rotation may be desirable, it is preferable to select a gear pump having a capacity sufficient to deliver the target amount of production by a proper number of revolution. Further, it may be preferable to cool or adjust the temperature of the body of the gear pump by means of adjustment of oil temperature or the like. Gear pumps may be also used in a tandem foam extrusion system too, in between the two extruders or between the secondary (cooling) extruder and the die.

Used herein, the phrase 'imaging element' comprises an imaging support along with at least one image receiving layer as applicable to multiple techniques governing the transfer of an image onto the imaging element. Such techniques include thermal dye transfer, electrophotographic printing, or inkjet printing, as well as a support for photographic silver halide images. As used herein, the phrase "photographic element" is a material that utilizes photosensitive silver halide in the formation of images. An embodiment of this invention may contain silver halide, inkjet receiving layers, thermal dye receiving layers or electrophotographic layers or combinations thereof. The elements may include those intended for reflection viewing, which usually have an opaque support, and those intended for viewing by transmitted light, which usually have a transparent support.

In a preferred embodiment, the present invention relates to an imaging element comprising at least one image receiving layer and a support, wherein said image receiving layer comprises an open celled microcellular foam. In another preferred embodiment, the imaging element comprises at least one image receiving layer, an absorbing layer and a support, wherein the absorbing layer comprises an open celled microcellular foam.

The support for use in the present invention may be any support typically used in imaging applications. Any of the above described embodiments of this invention could further be laminated to a substrate or support to further increase the utility of the imaging element. Typical supports may be fabrics, paper, and polymer sheets. The support may be either transparent or opaque, reflective or non-reflective. Opaque supports include plain paper, coated paper, resin-coated paper such as polyolefin-coated paper, synthetic paper, low density foam core based support, low density foam core based paper, photographic paper support, melt-extrusion-coated paper, and polyolefin-laminated paper. Biaxially oriented supports include a paper base and a biaxially oriented polyolefin sheet, typically polypropylene, laminated to one or both sides of the paper base. The support may also consist of microporous materials such as polyethylene polymer-containing material sold by PPG Industries, Inc., Pittsburgh, Pa. under the trade name of Teslin®, Tyvek® synthetic paper (DuPont Corp.), impregnated paper such as Duraform®, and OPPalyte® films (Mobil Chemical Co.) and other composite films listed in U.S. Pat. No. 5,244,861. Transparent supports include glass, cellulose derivatives, such as a cellulose ester, cellulose triacetate, cellulose diacetate, cellulose acetate propionate, cellulose acetate butyrate, polyesters, such as poly(ethylene terephthalate), poly(ethylene naphthalate), poly-1,4-cyclohexanedimethylene terephthalate, poly(butylene terephthalate), and copolymers thereof, polyimides, polyamides, polycarbonates, polystyrene, polyolefins, such as polyethylene or polypropylene, polysulfones, polyacrylates, polyether imides, and mixtures thereof. The papers listed above include a broad range of papers, from high end papers, such as photographic paper to low end papers, such as newsprint. In a preferred embodiment, Ektacolor paper made by Eastman Kodak Co. may be employed. The support may comprise a cast support, a sequentially cast support or a coextruded support.

The image receiving layer of the present invention may comprise a thermal image receiving layer. The thermal ink or dye image-receiving or recording layer of the receiving or recording elements used with the invention may comprise, for example, a polycarbonate, a polyurethane, a polyester, polyvinyl chloride, poly(styrene-co-acrylonitrile), poly(caprolactone), or mixtures thereof. The ink or dye image-receiving or recording layer may be present in any amount that may be effective for the intended purpose. An overcoat layer may be further coated over the ink or dye-receiving or recording layer, such as described in U.S. Pat. No. 4,775,657 of Harrison et al.

Ink or dye-donor elements that may be used with the ink or dye-receiving or recording element used with the invention conventionally comprise a support having thereon an ink or dye containing layer. Any ink or dye may be used in the ink or dye-donor employed in the invention, provided it is transferable to the ink or dye-receiving or recording layer by the action of heat. Ink or dye donors applicable for use in the present invention are described, for example, in U.S. Pat. Nos. 4,916,112; 4,927,803; and 5,023,228. As noted above, ink or dye-donor elements may be used to form an ink or dye transfer image. Such a process comprises image-wise-heating an ink or dye-donor element and transferring an ink or dye image to an ink or dye-receiving or recording element as described above to form the ink or dye transfer image. The thermal ink or dye transfer method of printing, an ink or dye donor element may be employed which comprises a poly(ethylene terephthalate) support coated with sequential repeating areas of cyan, magenta, and yellow ink or dye, and the ink or dye transfer steps may be sequentially performed for each color to obtain a three-color ink or dye transfer image. When the process is only performed for a single color, then a monochrome ink or dye transfer image may be obtained.

Dye-donor elements that may be used with the dye-receiving element used in the invention conventionally comprise a support having thereon a dye containing layer. Any dye may be used in the dye-donor employed in the invention provided it is transferable to the dye-receiving layer by the action of heat. Especially good results have been obtained with sublimable dyes. Dye donors applicable for use in the present invention are described, for example, in U.S. Pat. Nos. 4,916,112; 4,927,803 and 5,023,228, the disclosures of which are incorporated by reference. Specific examples of such dyes include the following:

Magenta Dye M-1

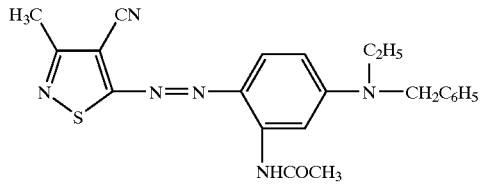

Magenta Dye M-2

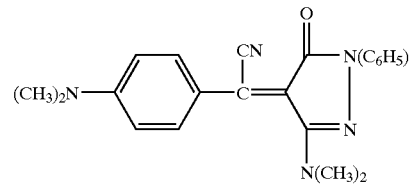

Magenta Dye M-3

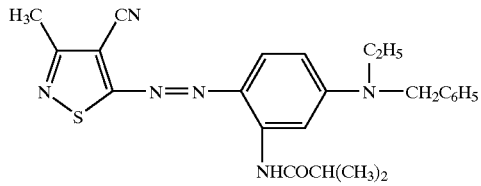

Yellow Dye Y-1

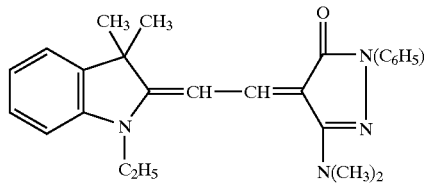

Yellow Dye Y-2

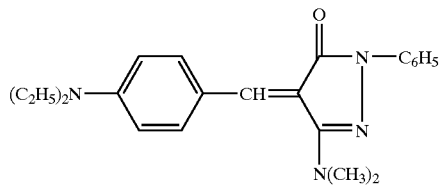

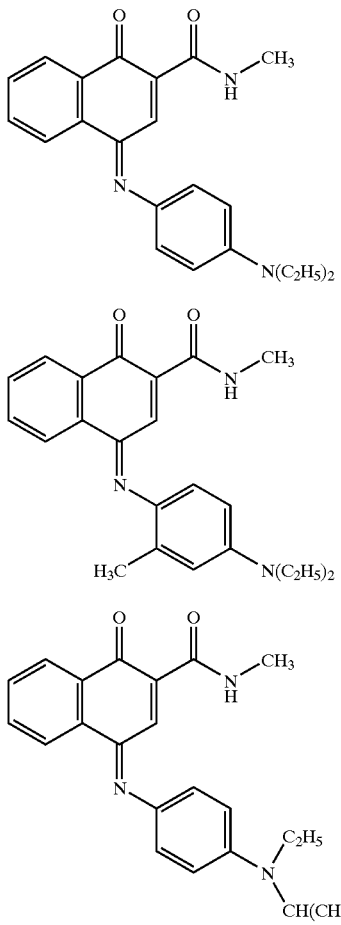

Cyan Dye C-1

Cyan Dye C-2

Cyan Dye C-3

As noted above, dye-donor elements may be used to form a dye transfer image. Such a process comprises imagewise-heating a dye-donor element and transferring a dye image to a dye-receiving element as described above to form the dye transfer image.

In a preferred embodiment of the invention, a dye-donor element may be employed which comprises a poly(ethylene terephthalate) support coated with sequential repeating areas of cyan, magenta and yellow dye, and the dye transfer steps are sequentially performed for each color to obtain a three-color dye transfer image. Of course, when the process is only performed for a single color, then a monochrome dye transfer image may be obtained. The dye-donor element may also contain a colorless area which may be transferred to the receiving element to provide a protective overcoat. This protective overcoat may be transferred to the receiving element by heating uniformly at an energy level equivalent to 85% of that used to print maximum image dye density.

Thermal printing heads which may be used to transfer ink or dye from ink or dye-donor elements to receiving or recording elements used with the invention may be available commercially. There may be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal ink or dye transfer may be used, such as lasers as described in, for example, GB No. 2,083,726A.

A thermal ink or dye transfer assemblage may comprise (a) an ink or dye-donor element, and (b) an ink or dye-receiving or recording element as described above, the ink or dye-receiving or recording element being in a superposed relationship with the ink or dye-donor element so that the ink or dye layer of the donor element may be in contact with the ink or dye image-receiving or recording layer of the receiving or recording element.

When a three-color image is to be obtained, the above assemblage may be formed on three occasions during the time when heat may be applied by the thermal printing head. After the first dye is transferred, the elements may be peeled apart. A second dye-donor element (or another area of the donor element with a different dye area) may be then brought in register with the dye-receiving or recording element and the process repeated. The third color may be obtained in the same manner.

In one preferred embodiment of this invention, an image recording element comprises a support, an open cell foam absorbing layer and a thermal dye-transfer dye-image receiving layer adjacent to the open cell foam absorbing layer. In this embodiment, the preferred void volume of the voided layer may be from 25% to 55%. The dye-transfer dye-image receiving layer typically would comprise a polymeric binder. Typical polymeric binders may be polyester or polycarbonate. In a preferred embodiment, the polymeric binder comprises both polyester and polycarbonate polymer. Typical weighted ratios of the polyester to the polycarbonate of the binder may be in the range of 0.8–4.0 to 1. It may be sometimes desirable for the thermal dye-transfer dye-image receiving layer to also comprise other additives. Lubricants may be added to enable improved conveyance through a printer. An example of a lubricant is a polydimethylsiloxane-containing copolymer. A preferred lubricant may be a polycarbonate random terpolymer of bisphenol A, diethylene glycol, and polydimethylsiloxane block unit and may be present in an amount of from 10% to 30% by weight of the image recording layer. Other additives that may be included in the thermal dye-transfer dye-image receiving layer may be plasticizers. Typical plasticizers that may be used comprise ester or polyester. A preferred plasticizer may be a mixture of 1,3-butylene glycol adipate and dioctyl sebacate. This plasticizer would typically be present in the dye-transfer dye-image receiving layer in a combined total amount of from 4% to 20% by weight of the dye-receiving layer.

The image receiving element may also comprise an inkjet receiving or recording element. The inkjet recording element utilizing the present invention would desirably be capable of absorbing or receiving large amounts of ink applied to the image-forming surface of the element as rapidly as possible in order to produce recorded images having high optical density and good color gamut. The open cell foam layer described above, by itself, may constitute an image recording element of this invention or have adjacent inkjet image recording layers which together comprise the image recording element.

One preferred embodiment of this invention is an image recording element with an open celled layer as described above with an inkjet recording layer adjacent to the open celled layer. The open cells, which are preferably interconnecting, enable absorption of liquid from inks disposed on the inkjet recording layer. Preferably, the absorbent capacity may be from 14 to 30 cc/m$^2$. The voiding should be such that the voids are preferably interconnected or open-celled. This type of structure enhances the ink absorption rate by enabling capillary action to occur.

An inkjet recording layer may be applied to the open celled layer to further enhance image quality. Such an inkjet recording layer may be porous with interconnecting voids as well. Such inkjet recording layers are described in U.S. Pat. No. 6,481,843.

Inks used to image the recording elements of the present invention are well known in the art. The ink compositions used in inkjet printing typically may be liquid compositions comprising a solvent or carrier liquid, dyes or pigments, humectants, organic solvents, detergents, thickeners, preservatives. The solvent or carrier liquid may be solely water or may be water mixed with other water-miscible solvents such as polyhydric alcohols. Inks in which organic materials such as polyhydric alcohols may be the predominant carrier or solvent liquid may also be used. Particularly useful are mixed solvents of water and polyhydric alcohols. The dyes used in such compositions may be typically water-soluble direct or acid type dyes. Such liquid compositions have been described extensively in the prior art including, for example, U.S. Pat. Nos. 4,381,946; 4,239,543; and 4,781,758, the disclosures of which are hereby incorporated by reference.

Any known inkjet receiver layer may be used in combination with other particulate materials. For example, the ink receiving or recording layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives, derivatives of natural polymers such as functionalized proteins, functionalized gums and starches, and cellulose ethers and their derivatives, and synthetic polymers such as polyvinyloxazoline, polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers, and combinations of these materials. Hydrophilic polymers, inorganic oxide particles, and organic beads may be present in one or more layers on the substrate or support and in various combinations within a layer.

A porous structure may be introduced into ink receiving or recording layers comprised of hydrophilic polymers by the addition of ceramic or hard polymeric particulates, by foaming or blowing during coating, or by inducing phase separation in the layer through introduction of non-solvent. In general, it is preferred for the base layer to be hydrophilic, but not porous. This may be especially true for photographic quality prints, in which porosity may cause a loss in gloss. In particular, the ink receiving or recording layer may consist of any hydrophilic polymer or combination of polymers with or without additives as is well known in the art.

If desired, the ink receiving or recording layer may be overcoated with an ink-permeable, anti-tack protective layer such as, for example, a layer comprising a cellulose derivative or a cationically-modified cellulose derivative or mixtures thereof. An especially preferred overcoat is poly β-1, 4-anhydro-glucose-g-oxyethylene-g-(2'-hydroxypropyl)-N, N-dimethyl-N-dodecylammonium chloride. The overcoat layer may be non porous, but may be ink permeable and serves to improve the optical density of the images printed on the element with water-based inks. The overcoat layer may also protect the ink receiving or recording layer from abrasion, smudging, and water damage. In general, this overcoat layer may be present at a dry thickness of from 0.1 to 5 µm, preferably from 0.25 to 3 µm.

In practice, various additives may be employed in the ink receiving or recording layer and overcoat. These additives include surface active agents such as surfactant(s) to improve coatability and to adjust the surface tension of the dried coating, acid or base to control the pH, antistatic agents, suspending agents, antioxidants, hardening agents to cross-link the coating, antioxidants, UV stabilizers, light stabilizers. In addition, a mordant may be added in small quantities (2%–10% by weight of the base layer) to improve waterfastness. Useful mordants are disclosed in U.S. Pat. No. 5,474,843.

There are many known formulations, which may be useful as ink or dye receiving or recording layers. The primary requirement is that the IRL is compatible with the inks which it will be imaged so as to yield the desirable color gamut and density. As the ink drops pass through the IRL, the ink or dyes may be retained or mordanted in the IRL, while the ink solvents pass freely through the IRL and may be rapidly absorbed by the TL. Additionally, the IRL formulation may be preferably coated from water, exhibits adequate adhesion to the TL, and allows for easy control of the surface gloss. For example, Misuda et al in U.S. Pat. Nos. 4,879,166; 5,264,275; 5,104,730; 4,879,166; and Japanese Patents 1,095,091; 2,276,671; 2,276,670; 4,267,180; 5,024,335; and 5,016,517 disclose aqueous based IRL formulations comprising mixtures of pseudo-bohemite and certain water soluble resins. Light in U.S. Pat. Nos. 4,903,040; 4,930,041; 5,084,338; 5,126,194; 5,126,195; and 5,147,717 discloses aqueous-based IRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous-coatable IRL formulations based on poly(vinyl alcohol). Iqbal in U.S. Pat. No. 5,208,092 discloses water-based IRL formulations comprising vinyl copolymers, which may be subsequently crosslinked. In addition to these examples, there may be other known or contemplated IRL formulations, which are consistent with the aforementioned primary and secondary requirements of the IRL, all of which fall under the spirit and scope of the current invention.

The IRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers.

It may also be desirable to overcoat the IRL for the purpose of enhancing the durability of the imaged element. Such overcoats may be applied to the IRL either before or after the element is imaged. For example, the IRL may be overcoated with an ink-permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, that is, continuous, piezoelectric, or thermal. Therefore, depending on the specific ink process, the inks may contain widely differing amounts and combinations of solvents, colorants, preservatives, surfactants, humectants. Inks preferred for use in combination with the image recording elements of the present invention may be water-based. However, it is intended that alternative embodiments of the image-recording elements as described above, which may be formulated for use with inks which may be specific to a given ink-recording process or to a given commercial vendor, fall within the scope of the present invention.

One or more subbing layers may be present on top of the support used with the invention or between the base and the image recording layer used with the invention. These layers may add functionality such as antistatic properties, control colorimetry, and improve image recording layer adhesion to the base. This layer may be an adhesive layer such as, for example, halogenated phenols, partially hydrolyzed vinyl chloride-co-vinyl acetate polymer, vinylidene chloride-methyl acrylate-itaconic acid terpolymer, a vinylidene chloride-acrylonitrile-acrylic acid terpolymer, or a glycidyl (meth)acrylate polymer or copolymer. Other chemical adhesives, such as polymers, copolymers, reactive polymers or copolymers, that exhibit good bonding between the ink receiving layer and the support may be used. Polymeric binder utilized in the subbing layer may be preferably a water soluble or water dispersible polymer such as poly (vinyl alcohol), poly(vinyl pyrrolidone), gelatin, a cellulose ether, a poly(oxazoline), a poly(vinylacetamide), partially hydrolyzed poly(vinyl acetate/vinyl alcohol), poly(acrylic acid), poly(acrylamide), poly(alkylene oxide), a sulfonated or phosphated polyester or polystyrene, casein, zein, albumin, chitin, chitosan, dextran, pectin, a collagen derivative, collodian, agar-agar, arrowroot, guar, carrageenan, tragacanth, xanthan, rhamsan, a latex such as poly(styrene-co-butadiene), a polyurethane latex, a polyester latex, or a poly(acrylate), poly(methacrylate), poly (acrylamide) or copolymers thereof.

The non-foamed image recording layers may be coated by conventional coating means commonly used in this art. Coating methods may include, but are not limited to, wound wire rod coating, knife coating, slot coating, slide hopper coating, gravure coating, spin coating, dip coating, skim-pan-air-knife coating, multilayer slide bead, doctor blade coating, gravure coating, reverse-roll coating, curtain coating, multilayer curtain coating. Some of these methods allow for simultaneous coatings of more than one layer, which is preferred from a manufacturing economic perspective if more than one layer or type of layer needs to be applied. Known coating and drying methods are described in further detail in *Research Disclosure* No. 308119, published December 1989, pages 1007–1008. After coating, the layers are generally dried by simple evaporation, which may be accelerated by known techniques such as convection heating.

The non-foamed coating composition may be applied to one or both substrate or support surfaces through conventional pre-metered or post-metered coating methods listed above. The choice of coating process would be determined from the economics of the operation and, in turn, would determine the formulation specifications such as coating solids, coating viscosity, and coating speed.

The non-foamed layers may be coated onto the open celled foam layers after the coextrusion or between casting of the foamed layers. Examples of this would be acrylic coatings for printability, coating polyvinylidene chloride for heat seal properties or barrier properties. Further examples include flame, plasma or corona discharge treatment to improve printability or adhesion. In addition it may also be possible to provide either an integral layer or a separately coated layer of either an electrical conductive or charge control layer to minimize the generation of electrostatic glow or discharge of a photosensitive imaging member. In the case of a charge control layer that is either integral to another functional layer or a functional layer by itself, the charge control agents may be substantially electrically neutral to the photosensitive emulsion or its protective overcoat.

In another embodiment, the imaging element may comprise an electrophotographic imaging element. The electrographic and electrophotographic processes and their individual steps have been well described in the prior art. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, may be accomplished by a variety of methods. The electrophotographic process of copiers uses imagewise photodischarge, through analog or digital exposure, of a uniformly charged photoconductor. The photoconductor may be a single use system, or it may be rechargeable and reimageable, like those based on selenium or organic photoreceptors.

In an alternate electrographic process, electrostatic images are created ionographically. The latent image is created on dielectric (charge holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to an electrophotographic image receiving element, here an open cell absorbent foam layer on a support. The receiving element is charged electrostatically, with the polarity chosen to cause the toner particles to transfer to the receiving element. Finally, the toned image is fixed to the receiving element. For self-fixing toners, residual liquid is removed from the receiving element by air drying or heating. Upon evaporation of the solvent, these toners form a film bonded to the receiving element. For heat-fusible toners, thermoplastic polymers are used as part of the particle. Heating both removes residual liquid and fixes the toner to receiving element.

The following examples are provided to illustrate the invention.

EXAMPLES

Experimental Materials

The plastic materials used were commercial low density polyethylene (LDPE) resins supplied by NOVA Chemicals. The product names are Novapol® Polyethylene LC-0522-A (denoted as LDPE-A) and LC-0717-A (denoted as LDPE-B). The melt index (ASTM D 1238, 190° C./2.16 kg) of LC-0522-A and LC-0717-A are 4.5 g/10 min and 7.0 g/10 min, respectively. The foamable polymer densities (ASTM D 792) are 0.9222 g/cm³ and 0.917 g/cm³, respectively. These polyethylene resins are biologically and chemically inert. The other foamable polymer resin used was polystyrene (PS) from NOVA Chemicals. The product name is Nova Crystal Heat Resistant PS 101. The melt index is 2.2 g/10 min and the density of this polystyrene is 1.04 g/cm³.

Figure 2:
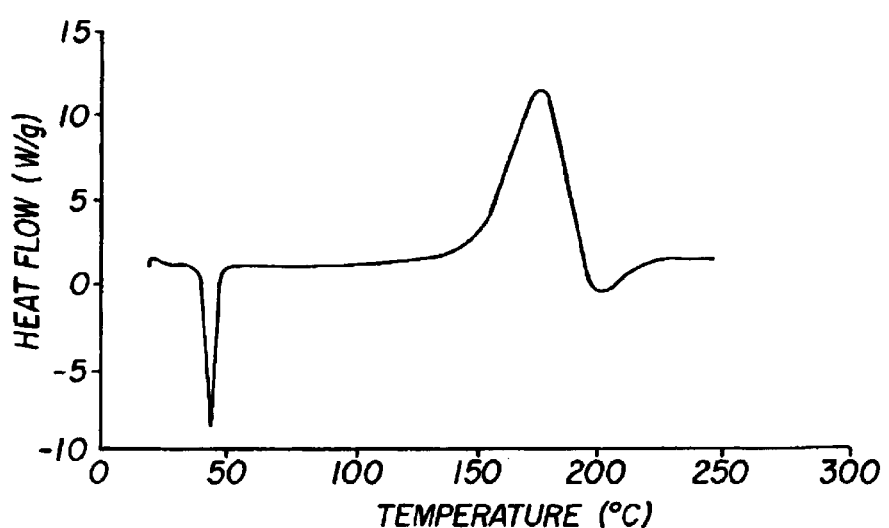
FIG. 2 illustrates a differential scanning calorimetry (DSC) thermogram of a crosslinking agent.

The crosslinking agent was an organic peroxide supplied by R. T. Vanderbilt Company Inc. This dicumyl peroxide has the trade name of Varox® DCP-40C. The melting or sublimation point of this chemical is 38° C. (100.4° F.) and the specific gravity is 1.6. This crosslinking agent is unstable and reactive with strong acids and strong oxidizers. The thermal behavior of this exothermic organic peroxide was examined using a DSC of TA Instruments Co. with a heating rate of 10 degrees/min. The onset temperature is around 150° C. as illustrated in FIG. 2.

The nucleating agent used in this study was talc supplied by Ingenia Polymers Inc. with a particle size of 2 to 3 $\mu$m. A fixed amount of 2 wt. % was used throughout the experiments. The $CO_2$, supplied by Matheson Gas Product Co. was utilized as a blowing agent. The $CO_2$ was a commercial grade with minimum 99.5% purity, where the sum of $N_2$, $O_2$, and $CH_4$ is less than 0.5%.

Experimental Procedure

Figure 13:
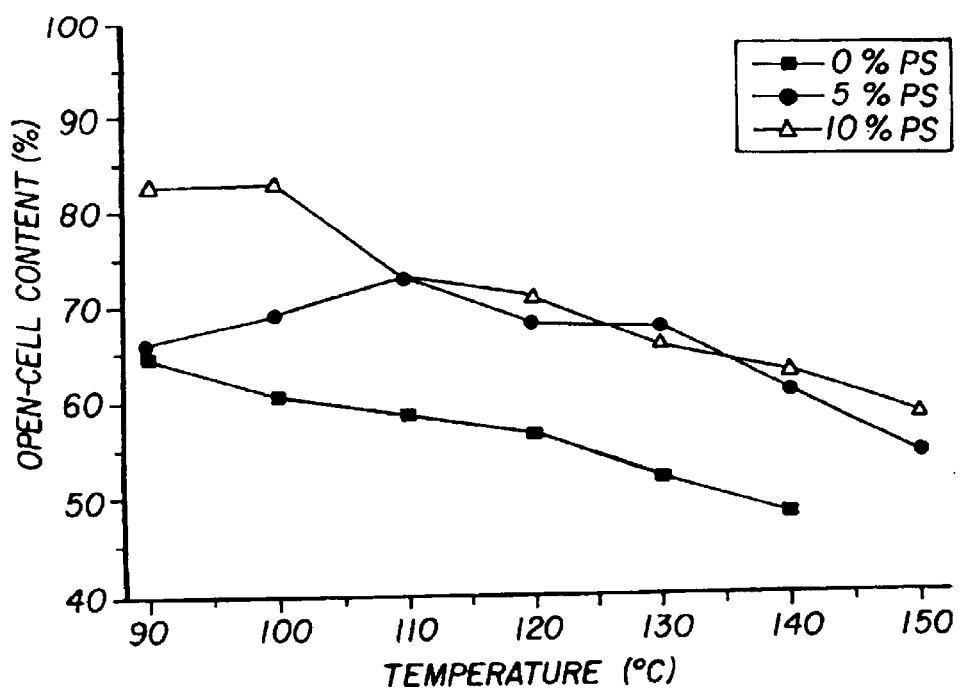
FIG. 13 illustrates the open cell content versus die temperatures of low density polyethylene (LDPE) blended with polystyrene (PS) at 100/0, 95/5, and 90/10 with 0.4 wt. % crosslinking agent, 8 wt. % $CO_2$.

A single screw extrusion foaming system was used for these experiments. The low density polyethylene (LDPE) pellets, mixed with 2.0 wt. % talc and a designated amount of crosslinking agent, were first fed into the barrel through the hopper and were completely melted by the screw motion. A designated amount of $CO_2$ was then injected into the extrusion barrel by a positive displacement pump, mixed with the foamable polymer melt stream in the barrel, and eventually dissolved in the melt. The single phase foamable polymer/gas solution went through the gear pump and was fed into the heat exchanger, where it was cooled to a designated temperature. The cooled foamable polymer/gas solution entered the die and foaming occurred at the die exit. The melt and die temperatures were synchronized as discussed earlier. While fixing all the other materials and processing parameters such as the screw speed, gear pump speed, blowing agent content and barrel temperatures, the melt and die temperatures were lowered step by step, and samples were randomly collected at each set temperature only after the system reached the equilibrium state. FIGS. 5, 6, 8, 9, 11, 12, and 14 were generated using an L/D=17.78 mm/1.016 mm. FIGS. 7, 10, 13 die L/D=2.54 mm/0.457 mm.

The foam samples were characterized using an optical microscope (Wild Heerburgg) and/or a scanning electron microscope (SEM, Hitachi 510) depending on the cell sizes. The foam samples were dipped in liquid nitrogen and then fractured to expose the cellular morphology before the characterization of foam structure. The foam samples were also characterized using a gas pycnometer (Quantachrome Co.) for measuring the open cell content.

Characterization of Open Celled Foams—Cell Population Density & Volume Expansion Ratio For characterization, a portion of the filamentary shape extrudate is collected randomly and then fractured after being immersed in liquid nitrogen for one minute. Scanning electron microscopy (SEM) was used to check the cell density and cell uniformity of micro sized cells on the fractured surface, whereas a handheld microscope was used for large sized cells.

The cell (-population) density (n) is calculated as the number of cells per unit volume with respect to the unfoamed foamable polymer. First, the number of cells, $n_b$, in a defined area, l×l, is determined, and then the total number of cells per cubic centimeter is calculated as follows:

$$n = \left(\frac{n_b}{l^2}\right)^{\frac{3}{2}} \times 10^3 \times \varphi \qquad (1)$$

where l is the side length in mm and $\phi$ the expansion ratio. The expansion ratio of foam is determined by measuring the weight and volume of the sample. It is calculated as the ratio of the bulk density of pure polymer materials ($\rho_p$) to the bulk density of the foam sample ($\rho_f$) as shown in Eq. (2):

$$\varphi = \frac{\rho_p}{\rho_f} \qquad (2)$$

The average cell wall thickness ($\delta$) is calculated based on the cube model [H. E. Naguib, Ph.D thesis, Univ. of Toronto (2001).].

$$\delta = \left(\sqrt[3]{\frac{\varphi}{\varphi-1}} - 1\right) \times \sqrt[3]{\frac{\varphi-1}{n}} \qquad (3)$$

Characterization of Open Celled Foams—Open Cell Content

A stereo type gas pycnometer from Quantachrome Corp. was used to measure the open cell content. This gas pycnometer was utilized to determine the accessible cellular volume of a foam structure by the principle that the increase in volume of a confined gas results in a proportionate decrease in pressure. This apparatus consists of two chambers with a known volume connected by a valve. One of the chambers, the calibrated sample chamber, is accessible for insertion of the test sample and is connected to a high purity gas source. The pressure in the sample chamber is increased to a predetermined pressure and this value, $P_1$, is noted. The valve between the two chambers is then opened and the second, lower pressure, $P_2$, is again noted. The ratio of the pressure change, $P_1/P_2$, is directly related to the volume of the sample chamber displaced by the specimen. The difference between this volume and the geometric volume of the sample piece is a measure of the open cell volume. The detailed open cell content calculation procedure is described in ASTM D6226-98.

Figure 5:
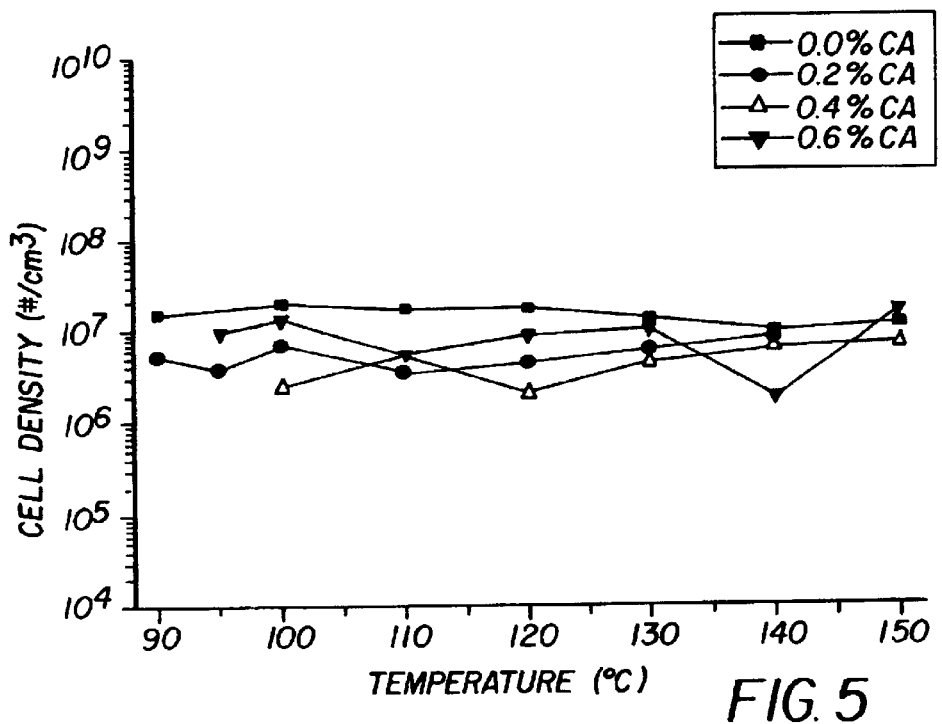
FIG. 5 illustrates cell densities versus die temperatures of low density polyethylene with crosslinking agent varying from 0.0, to 0.6 wt %, and 8 wt. % $CO_2$, 0 wt. % PS.
Figure 6:
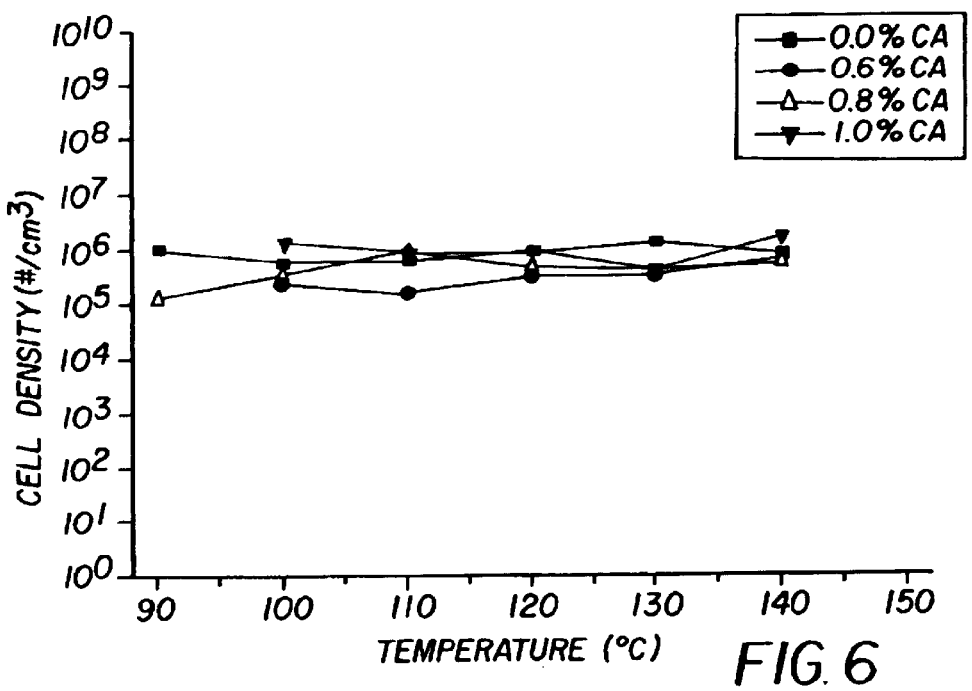
FIG. 6 illustrates cell densities versus die temperatures of low density polyethylene (LDPE) with Crosslinking Agent Contents varying from 0 to 1.0 wt. %, 8 wt. % $CO_2$, 0% PS.
Figure 7:
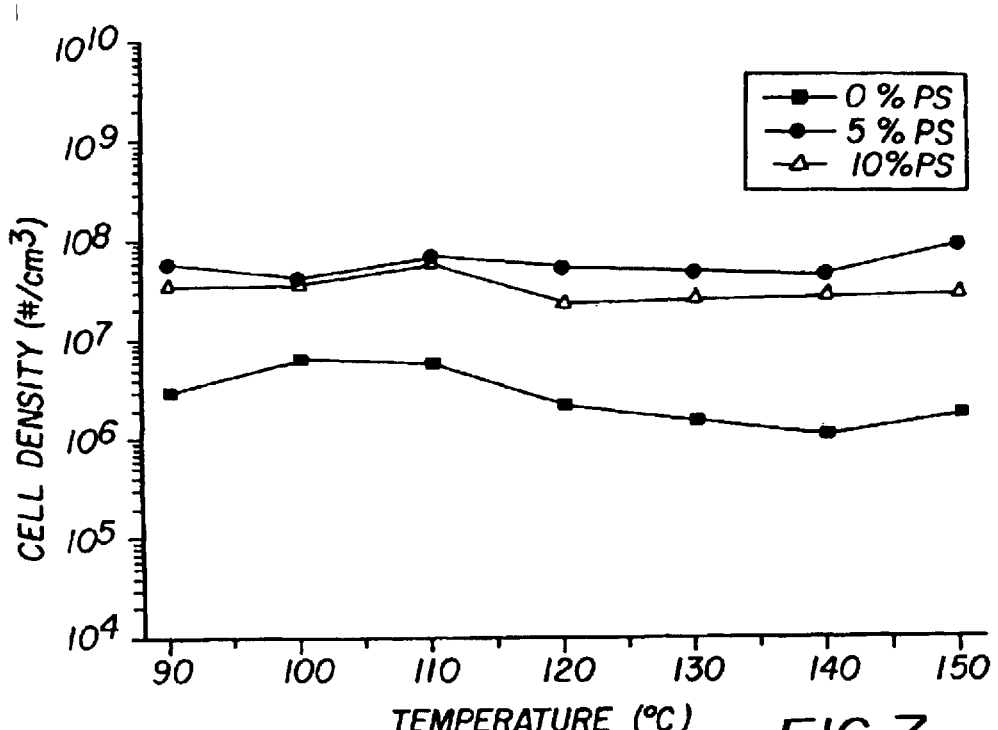
FIG. 7 illustrates the cell density versus die temperatures of low density polyethylene (LDPE) blended with polystyrene (PS) 100/0, 95/5, 90/10 with 0.4 wt. % crosslinking agent, 8 wt. % $CO_2$.

FIGS. 5 and 6 show the cell population densities of low density polyethylene (LDPE) foams. The effect of die temperature (which results in changing melt temperature), crosslinking agent concentration, and type of resin used for foaming is also illustrated in FIGS. 5 and 6. It is observed that cell densities obtained using low density polyethylene (LDPE) A are greater than low density polyethylene (LDPE) B by about an order of magnitude. Thus, type of resin used for foaming affects cell density. Furthermore, it is observed that it was possible to achieve cell densities greater or equal to $10^6$ cells/cm³, so cells are microcellular in range. It is also observed that temperature does not have significant impact on cell density for these experimental conditions. Also, it is observed that crosslinking agent concentration has a small effect on cell density.

FIG. 7 shows an example of cell density for a polymer blend, where the blend is created using an immiscible polymer, resulting in a high open cell content foam. Here, polystyrene (PS) is the immiscible polymer added to low density polyethylene (LDPE). This is an example of use of incompatible blends for high open cell content foams. The cell population density is observed to be a function of the polystyrene (PS) content, whereas the crosslinking agent content and the temperature did not affect the cell density much. The small amount of added polystyrene (PS) dramatically increased the cell density by one to two orders of magnitude and a very high cell density of $10^8$ cells/cm$^3$ was achieved. It is well known in the art, that volume fraction and viscosity ratio of dispersed phase to the continuous phase affect the domain size of the dispersed phase. Here, polystyrene is the dispersed phase. An optimum size of polystyrene phase may exist with respect to resultant cell density and thus resultant cell size.

Figure 8:
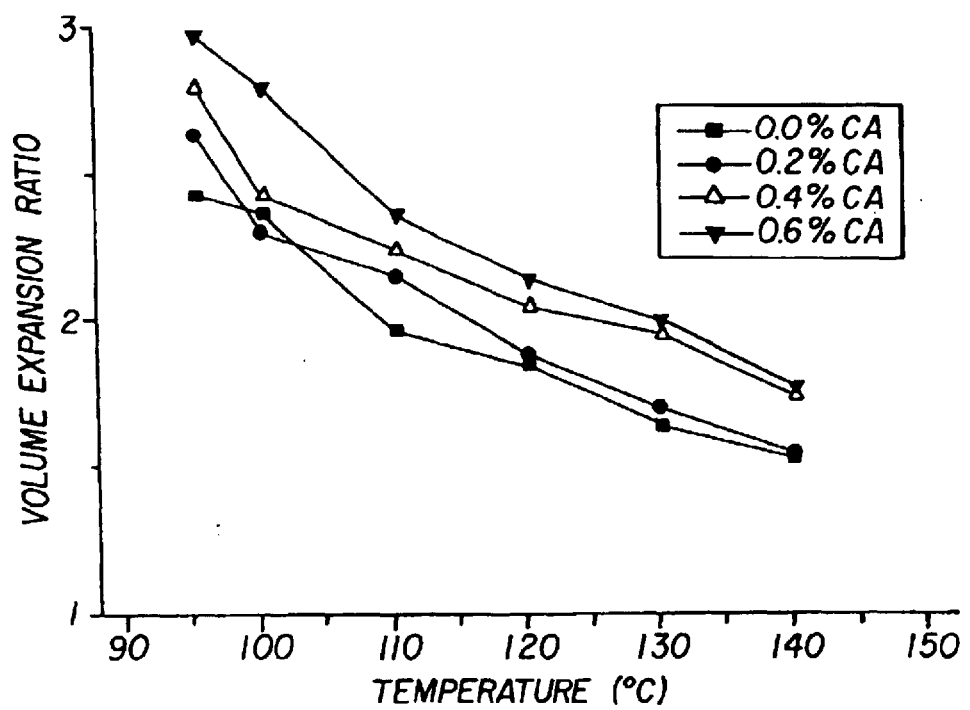
FIG. 8 illustrates the volume expansion ratio versus die temperatures of low density polyethylene (LDPE) with crosslinking agent contents varying from 0 to 0.6 wt. %, 8 wt. % $CO_2$, 0% PS.

FIG. 8 shows the volume expansion ratio of extruded low density polyethylene (LDPE) foams. Though the cell densities for a similar experiment, illustrated by FIG. 5, did not significantly change with die temperature or crosslinking agent concentration, it is observed that volume expansion ratio increased significantly with a decrease in die temperature and increase in crosslinking agent concentration. FIG. 8 further highlights the efficacy of using crosslinking agent to increase volume expansion ratio for a given temperature condition. It would be possible to operate at higher die temperatures (resulting in higher melt temperatures) by using a crosslinking agent and yet obtain high volume expansion ratios.

Figure 9:
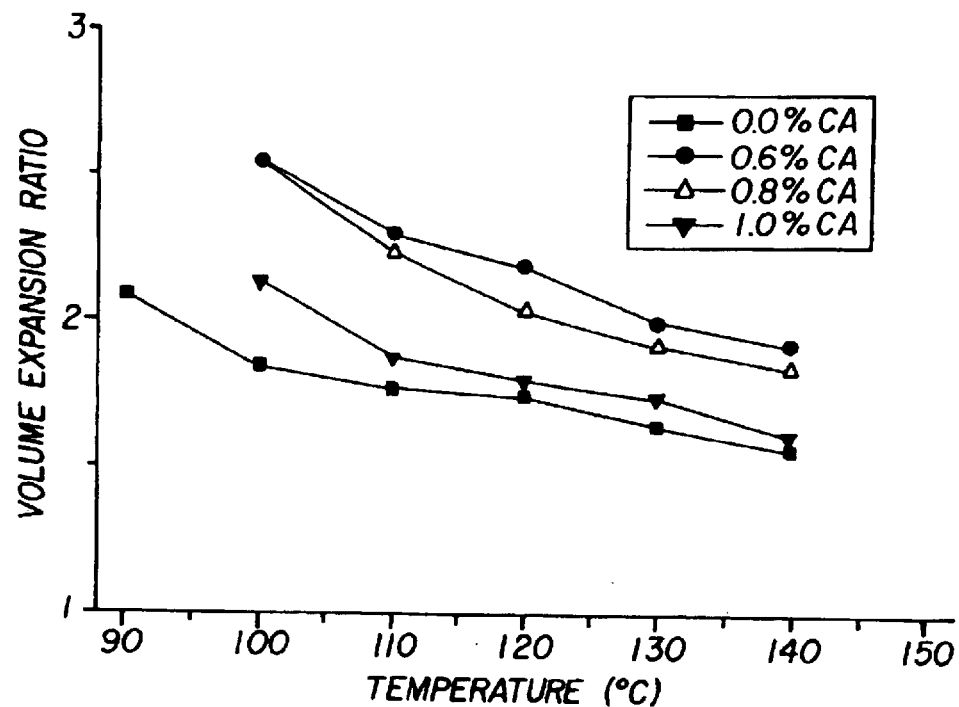
FIG. 9 illustrates the volume expansion ratio versus die temperatures of low density polyethylene (LDPE) with crosslinking agent content varying from 0 to 1.0 wt. %, 8 wt. % $CO_2$, 0% PS.
Figure 10:
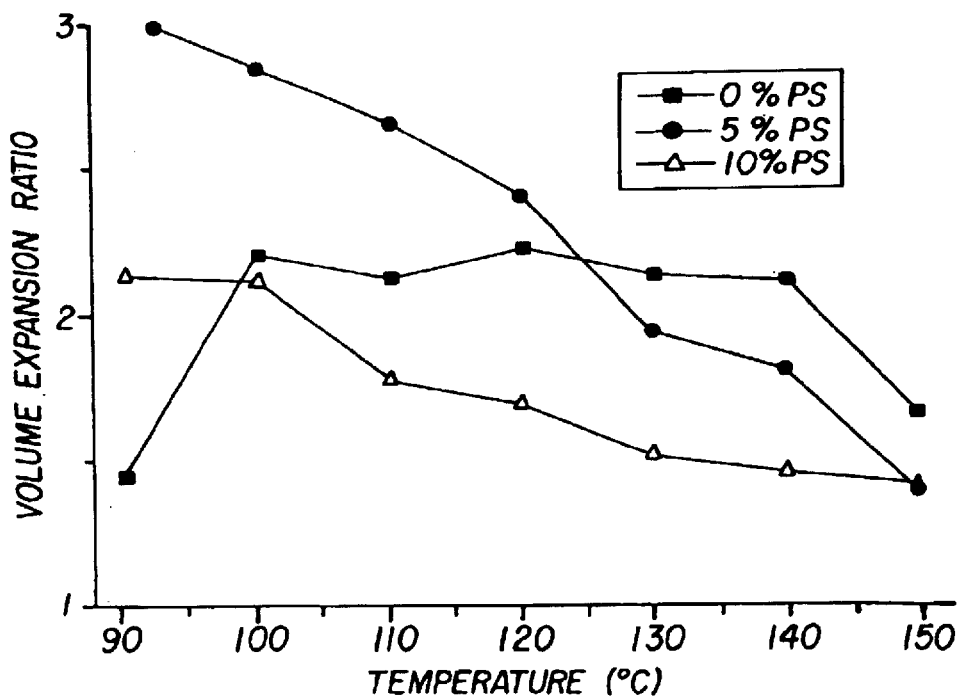
FIG. 10 illustrates the volume expansion ratio versus die temperatures of low density polyethylene (LDPE) blended with polystyrene (PS) in ratios of 100/0, 95/5, 90/10 with 0.4 wt. % crosslinking agent, 8 wt. % $CO_2$.

FIG. 9 shows the expansion ratio of another extruded low density polyethylene (LDPE-B). Though cell densities were shown to be insensitive to melt temperature or crosslinking agent concentration for this resin (FIG. 6), it is observed that volume expansion ratios are affected by the same processing parameters. However, too high a melt stiffness due to excessive crosslinking (at 0.8 wt % and 1.0 wt % of crosslinking agent) worked unfavorably for achieving high volume expansion as shown in FIG. 9. For a given polymer system, there may be an optimum crosslinking agent concentration in order to obtain high volume expansion ratios as well as high cell densities corresponding to microcellular foam.

FIG. 10 shows the expansion ratio of extruded low density polyethylene/polystyrene (LDPE/PS) blend foams. As with low density polyethylene (LDPE), the volume expansion ratios increased as the temperature decreased. Unlike examples with crosslinking agent addition, the addition of polystyrene (PS) phase to the low density polyethylene (LDPE) matrix tended to decrease the volume expansion ratios for most temperature conditions, most likely because of the poor interface of polystyrene (PS) and low density polyethylene (LDPE).

FIGS. 11 and 12 illustrate that the polymeric material composition chosen may affect open cell content. In addition, FIGS. 11 and 12 illustrates the use of crosslinking agent to produce increased open cell content for various die temperatures. The maximum open cell content obtained in this experiment was 84%.

FIGS. 11 and 12 show the open cell contents obtained while varying the crosslinking agent in the range of 0.0 to 1.0 wt. %. Because of the resultant high viscosity, the content of the crosslinking agent could not be increased over 0.6 wt. % for one of the low density polyethylene resins. FIG. 11 shows that the open cell content increased as the crosslinking agent amount increased up to 0.6 wt. %. This indicates that an increase of non-homogeneity in the thermoplastic resin matrix, for example, low density polyethylene (LDPE) matrix, by increasing the crosslinking agent amount enhances the cell opening.

FIG. 12 is another illustration that the polymeric material composition chosen may affect open cell content. In addition, FIG. 12 illustrates the use of crosslinking agent to produce increased open cell content. FIG. 12 shows that the open cell content increased as the crosslinking agent amount increased up to 0.8 wt. %. This indicates that an increase of non-homogeneity in the thermoplastic resin matrix, for example, low density polyethylene (LDPE) matrix, by increasing the crosslinking agent amount enhances the cell opening. However, FIG. 12 illustrates that too high an amount of the crosslinking agent may negatively affect the open cell content. With the use of crosslinking agents, there may be an optimum content of crosslinking agent for cell opening. On the other hand, the dispersion of crosslinked sections (i.e., the morphology or size of the gels) may have affected the open cell content significantly in addition to the degree of crosslinking (i.e., the gel content).

Low density polyethylene (LDPE) melt blended with a small amount of polystyrene (PS) may be effective for further increasing the open cell content, as illustrated in FIG. 13. FIG. 13 is an illustration of the capability of using crosslinking agent content, die temperature (or corresponding melt temperature), and an incorporation of immiscible polymer, to tailor the open cell content. A significant increase in the immiscible polymer content, here polystyrene (PS) content in the blend may have a negative effect on open cell content.

Figure 14:
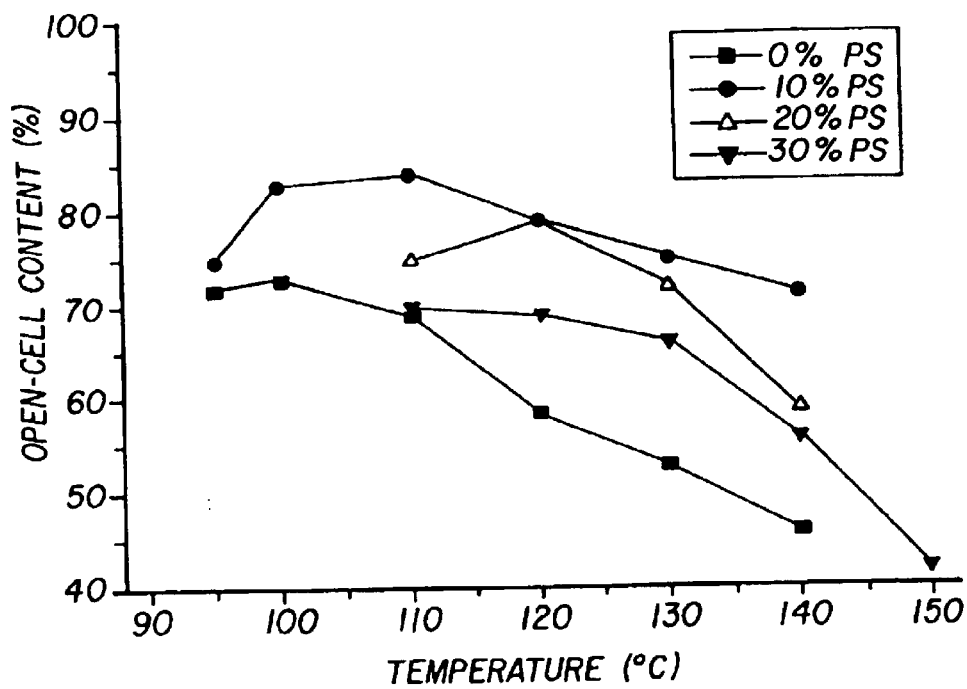
FIG. 14 illustrates the open cell content versus die temperature of low density polyethylene (LDPE) blended with polystyrene (PS) at 100/0, 90/10, 80/20, and 70/30 with 0.4 wt. % crosslinking agent, 8 wt. % $CO_2$.

FIG. 14 is an illustration of one possible effect. For a given blend system, there will be an optimum immiscible polymer content one might want to use in order to maximize open cell content.

Figure 15:
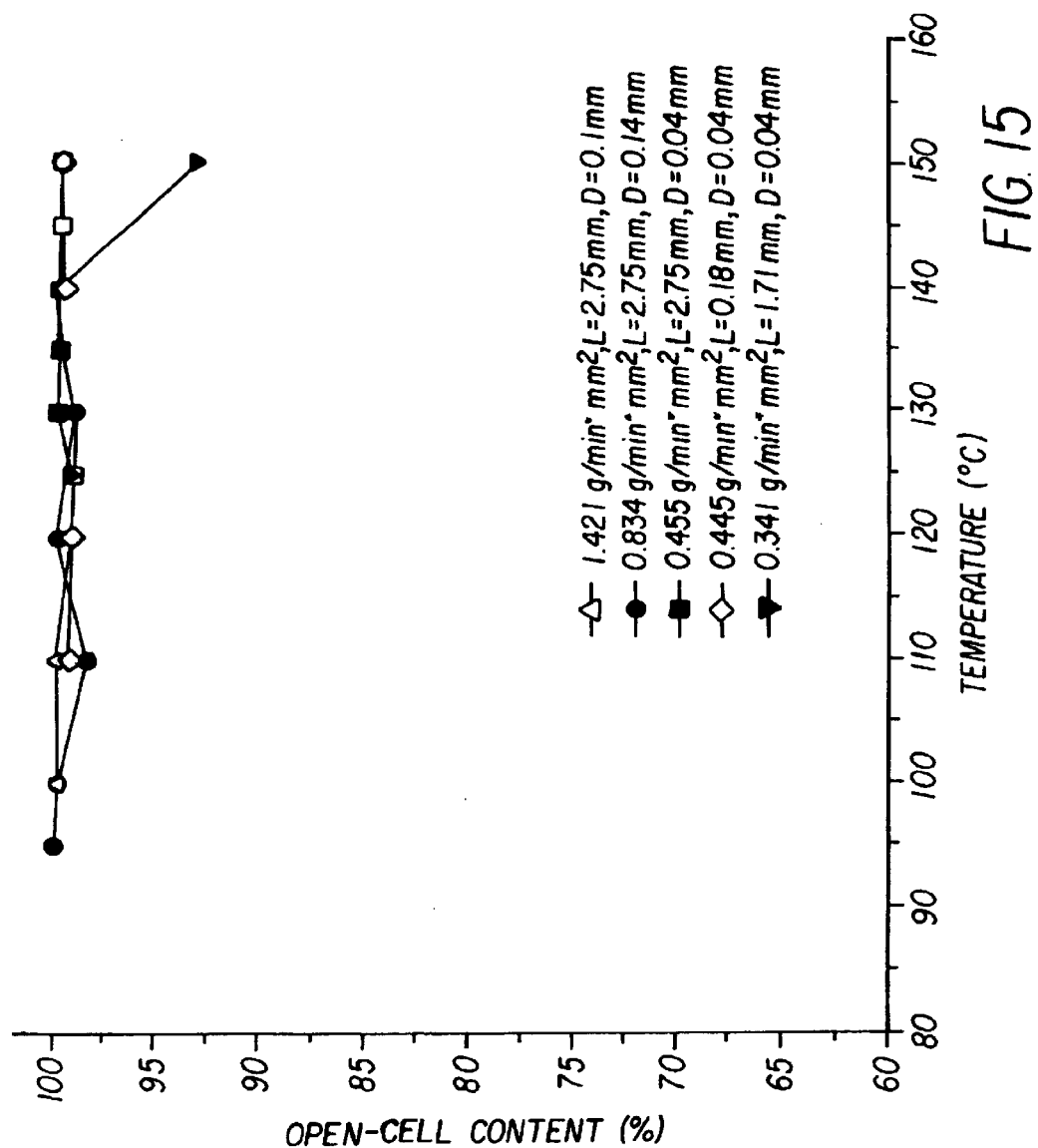
FIG. 15 illustrates open cell contents with 15 wt. % $CO_2$ and 6 wt. % butane addition.

Another method of increasing open cell content is through tailoring the blowing agent mixture. FIG. 15 is an example of the ability to increase open cell content as high as 99% with use of normal butane as a blowing agent along with $CO_2$.

Figure 16:
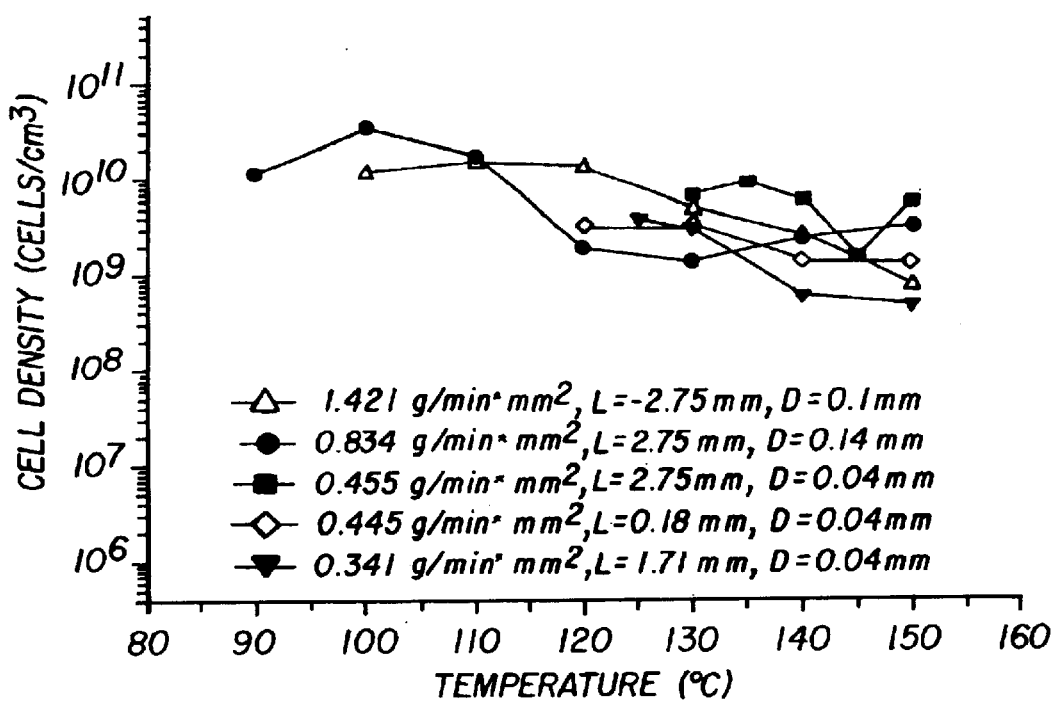
FIG. 16 illustrates cell densities with 15 wt. % $CO_2$ and 6 wt. % butane addition.

For corresponding compositions it is observed that cell densities could be increased to as high as $10^{10}$ cells/cm$^3$. This is illustrated in FIG. 16. The experimental data shown in FIG. 15 and FIG. 16 were obtained using an annular die whose dimensions are noted on the figures and relevant experimental conditions are also noted in the figures.

The invention has been described in detail with particular reference to certain preferred embodiments thereof, but it will be understood that variations and modifications can be effected within the spirit and scope of the invention.

What is claimed is:

1. A method for making an open celled microcellular foam comprising providing at least one foamable polymer, an immiscible thermoplastic polymer and a crosslinking agent in an extruder, injecting at least one blowing agent into said at least one foamable polymer, said immiscible thermoplastic polymer and said crosslinking agent in said extruder, blending said blowing agent injected into said at least one foamable polymer, said immiscible thermoplastic polymer and said crosslinking agent in said extruder, feeding said blended blowing agent, at least one foamable polymer, said immiscible thermoplastic polymer and said crosslinking agent in said extruder to a die, and depressurizing said blended blowing agent, said at least one foamable polymer, said immiscible thermoplastic polymer and said crosslinking agent, wherein said foamable polymer comprises a thermoplastic foamable polymer.

2. The method of claim 1 wherein said thermoplastic foamable polymer comprises at least one member selected from the group consisting of polyolefins, polyester, polystyrenes, acrylics, poly(vinyl alcohol) or polyamides or copolymers thereof.

3. The method of claim 1 wherein said thermoplastic foamable polymer comprises polyethylene or polypropylene.

4. The method of claim 1 wherein said extruder is under pressures greater than the solubility pressure of said blowing agent after injecting said blowing agent into said at least one foamable polymer and said crosslinking agent.

5. The method of claim 4 wherein the temperature in said extruder is greater than the melting point or glass transition temperature of said foamable polymer.

6. The method of claim 1 wherein said extruder and said die are under pressures greater than the solubility pressure of said blowing agent after injecting said blowing agent into said at least one foamable polymer and said crosslinking agent and downstream process equipment.

7. The method of claim 6 wherein the temperature in said extruder is greater than the melting point or glass transition temperature of said foamable polymer.

8. The method of claim 1 wherein said blowing agent comprises a physical blowing agent.

9. The method of claim 8 wherein said blowing agent comprises a gas.

10. The method of claim 9 wherein said gas comprises $CO_2$ or normal or isobutane.

11. The method of claim 1 wherein said open celled microcellular foam comprises open cells less than 50 microns in average diameter.

12. The method of claim 1 wherein said open celled microcellular foam comprises open cells from 10 to 50 microns in average diameter.

13. The method of claim 1 wherein said open celled microcellular foam comprises more than 80% open cells by volume.

14. The method of claim 1 wherein said open celled microcellular foam comprises from 60% to 90% open cells by volume.

15. The method of claim 1 wherein said crosslinker comprises a peroxide or an epoxide.

16. The method of claim 1 wherein said crosslinker comprises from 0.01 to 10% by weight of said thermoplastic foamable polymer.

17. The method of claim 1 further comprising passing said at least one foamable polymer and said blowing agent in said extruder through a cooling device.

18. The method of claim 17 wherein said cooling device is at a temperature below the melting point or glass transition temperature of said foamable polymer.

19. The method of claim 1 wherein said immiscible thermoplastic polymer comprises polystyrene.

* * * * *